US008268092B2

(12) United States Patent
Yang et al.

(10) Patent No.: US 8,268,092 B2
(45) Date of Patent: Sep. 18, 2012

(54) MAGNETIC SHEET FOR RADIO FREQUENCY IDENTIFICATION ANTENNA, METHOD OF MANUFACTURING THE SAME, AND RADIO FREQUENCY IDENTIFICATION ANTENNA USING THE SAME

(75) Inventors: Jae Suk Yang, Gyeonggi-do (KR); Hyeon Chul Lim, Gyeonggi-do (KR); Byoung Ki Lee, Gyeonggi-do (KR); Yong Sup Lee, Gyeonggi-do (KR); Yong Hyun Kim, Gyeonggi-do (KR); Yong Sul Song, Seoul (KR); Sang Kyun Kwon, Gyeonggi-do (KR); Beom Jin Kim, Seoul (KR)

(73) Assignee: Amotech Co., Ltd., Incheon (KR)

( * ) Notice: Subject to any disclaimer, the term of this patent is extended or adjusted under 35 U.S.C. 154(b) by 138 days.

(21) Appl. No.: 12/841,347

(22) Filed: Jul. 22, 2010

(65) Prior Publication Data
US 2010/0288418 A1 Nov. 18, 2010

Related U.S. Application Data

(62) Division of application No. 11/410,110, filed on Apr. 25, 2006, now abandoned.

(30) Foreign Application Priority Data

Apr. 26, 2005 (KR) .................. 10-2005-0034460
Mar. 16, 2006 (KR) .................. 10-2006-0024493

(51) Int. Cl.
*H01F 1/147* (2006.01)
*H01F 1/16* (2006.01)
(52) U.S. Cl. .................. 148/121; 148/120; 427/131
(58) Field of Classification Search .................. None
See application file for complete search history.

(56) References Cited

U.S. PATENT DOCUMENTS

| 4,705,578 A * | 11/1987 | Lin et al. ............. 148/108 |
| 4,992,329 A * | 2/1991 | Ishii et al. ............ 428/328 |
| 2005/0162331 A1 * | 7/2005 | Endo et al. ............ 343/788 |

* cited by examiner

*Primary Examiner* — John Sheehan
(74) *Attorney, Agent, or Firm* — Rosenberg, Klein & Lee

(57) ABSTRACT

Provided are a magnetic sheet for use in a radio frequency identification (RFID) antenna, an RFID antenna including the magnetic sheet, and a method of manufacturing the magnetic sheet, in which the magnetic sheet includes an amorphous alloy selected from the group consisting of Fe—Si—B, Fe—Si—B—Cu—Nb, Fe—Zr—B and Co—Fe—Si—B. The magnetic sheet is made by laminating amorphous alloy ribbons made of an amorphous alloy between magnetic sheet layers formed of alloy powder including at least one amorphous alloy and then compression-molding the amorphous alloy ribbons, to thereby control microcrack of the amorphous alloy ribbons and enhance characteristic of an end-product. The magnetic sheet is also thin, and has an excellent magnetic permeability, and a simple manufacturing process.

5 Claims, 12 Drawing Sheets

MAGNETIC SHEET FOR RADIO FREQUENCY IDENTIFICATION ANTENNA, METHOD OF MANUFACTURING THE SAME, AND RADIO FREQUENCY IDENTIFICATION ANTENNA USING THE SAME

RELATED APPLICATIONS

This application is a Divisional patent application of co-pending application Ser. No. 11/410,110, filed on 25 Apr. 2006. The entire disclosure of the prior application Ser. No. 11/410,110, from which an oath or declaration is supplied, is considered a part of the disclosure of the accompanying Divisional/Continuation application and is hereby incorporated by reference.

BACKGROUND OF THE INVENTION

1. Field of the Invention

The present invention relates to a magnetic sheet for use in a radio frequency identification (RFID) antenna, a method of manufacturing the same, and a radio frequency identification (RFID) antenna using the magnetic sheet. More particularly, the present invention relates to a magnetic sheet for use in a radio frequency identification (RFID) antenna, a method of manufacturing the same, and a radio frequency identification (RFID) antenna using the magnetic sheet, in which the magnetic sheet is a mono-layer structure which is made of alloy powder including at least one amorphous alloy, or a multi-layer structure which is formed by laminating an amorphous alloy ribbon made of an amorphous alloy between magnetic sheet layers and compression-molding the same.

2. Description of the Related Art

Recently, a radio frequency identification (RFID) system communicating data between a transponder including an integrated circuit (IC) chip and a reader/writer, or between a transponder and a reader is being widely spread. Since the RFID system communicates data using a respective antenna which is included in a transponder and a reader/writer, the transponder and the reader/writer do not need to contact each other to communicate data therebetween. Thus, although the transponder is far from the reader/writer by several centimeters to several tens of centimeters, they can communicate each other. Since the radio frequency identification (RFID) system is not sensitive to contamination or static electricity, it is being used in various fields including a production control in a factory, the administration of physical distribution, an inventory control, and an entrance and exit control.

For example, mobile phones employ a radio frequency identification (RFID) system. Generally, the mobile phone includes a main body and a battery unit which are separably combined with each other. In the case of the mobile phone using the RFID system, the main body includes an integrated circuit (IC) chip on a surface which contacts the battery unit, and the battery unit includes a tag antenna on the reverse surface which does not contact the main body and a battery on the surface which contacts the main body.

The tag antenna and the battery forming the battery unit may be incorporated in a plastic case. Here, the IC chip of the main body and the tag antenna of the battery unit play a role of a transponder of the RFID system, and these communicate data with a reader positioned at the outside of the mobile phone. In more detail, in the case of a RFID mobile phone chiefly using the frequency of 135 kHz or less or 13.56 MHz, especially, an inductive mode, a reader antenna produces a sine wave which is a radio frequency electromagnetic wave, using mainly using the frequency of 13.56 MHz. Accordingly, if the energy is delivered to the tag antenna, that is, toward the transponder antenna through the reader antenna, the transponder is activated and the reader receives data from the tag antenna.

The RFID system of the frequency region as described above, achieves mutual communications by an inductive electromagnetic coupling of a transformer mode. For this purpose, the tag antenna may be formed of a rectangular planar spiral inductor. In this case, communications are achieved by a LC resonance of an antenna, in which a resonant frequency is determined by the inductance of an inductor and the capacitance of a capacitor. Generally it is important that a transponder is designed to employ a parallel resonance circuit, in which it is designed to obtain the maximum impedance at the resonant frequency by the LC resonance in order to obtain the maximum voltage with the minimum current.

FIG. 1 illustrates a radio frequency identification (RFID) system including a reader 100 and a transponder 200 between which data communications are achieved by an inductive coupling mode. The reader 100 includes an oscillator 1 for producing an electromagnetic wave of 13.56 MHz, a capacitor 2, a resistor 3, and a coil 8. In the transponder 200, a magnetic field 6 generated from the coil 8 in the reader 100 reaches a radio frequency identification (RFID) antenna coil 7 attached to the transponder 200 and thus voltage is induced across the coil 7. The induced voltage passes through the capacitor 2 connected in parallel with the RFID antenna coil 7 and a diode 4 connected in series with the RFID antenna coil 7 and thus direct-current (DC) voltage is supplied to a radio frequency identification (RFID) chip 5.

As the RFID chip 5 is supplied with the DC voltage, the transponder 200 is activated to transfer ID information stored in the RFID chip 5 to the reader 100 through the RFID antenna coil 7.

In this case, the voltage induced in the tag antenna is determined by the Faraday's law and Lenz's law. Therefore, it becomes more advantageous to obtain a higher voltage signal, as a more amount of magnetic flux interlink with the transponder antenna coil. The amount of the magnetic flux becomes larger, as an amount of a soft magnetic material included in the transponder antenna coil becomes larger and the magnetic permeability of the soft magnetic material becomes higher. Particularly, since the RFID system performs contactless data communications intrinsically, it is necessary to have an absorber sheet which is made of a magnetic material having a high magnetic permeability in order to focus a radio frequency electromagnetic wave which is made in the reader antenna on the tag antenna.

In the case of an antenna coil for use in a generally given transponder, an inductance of the antenna coil is in proportion to the magnetic permeability of the magnetic material. In a communications process, as the inductance of the transponder antenna becomes high, higher voltage is induced proportionally to the inductance of the transponder antenna. Accordingly, if a magnetic material having a higher magnetic permeability is employed as a material of the absorber sheet for the tag antenna, a data communication distance is increased and an error probability of data can be lowered.

The conventional magnetic material for use in an absorber sheet for a mobile phone RFID antenna is fabricated into a sheet form which is formed by mixing the ferrite including Mn—Zn group oxide or Ni—Zn group oxide together with resin. In the conventional technology, it is very difficult to tune the LC resonance circuit since an inductance deviation of the transponder antenna is serious due to the non-uniformity of the thickness of these ferrites. Moreover, the non-uniformity exceeding the error range of the thickness may cause difficulty of an installation when a magnetic sheet is attached in a battery pack space, and an error occurs in the process of the formation and transmission of binary code data during the mutual transmission process of data, to thereby make a very high inferiority ratio, as well.

Moreover, the recent mobile phone adopts high functions such as a game, a video communication, an Internet function addition, and a camera. Accordingly, an amount of the power consumption increases. As a result, it is necessary to have the volume of a battery as large as possible. Furthermore, miniaturization and thin shaping of a device is being progressed. But in the case that the absorber sheet for the RFID antenna made of ferrite is in the thickness of 0.35 mm or less, the inductance for the RFID communications of the transponder antenna is low. In this case, the communications distance is excessively shortened, that is, the quality of performance is not implemented. As a result, development of a new material is acutely needed.

In the meantime, the Moly Permalloy Powder (MPP) containing permalloy or molybdenum (Mo) having an excellent soft magnetic property is used as a magnetic material of an absorber for a mobile phone RFID antenna. The Permalloy or MPP is excellent in view of a soft magnetic property in comparison with ferrite and thus is used as the absorber sheet for the mobile phone RFID antenna even in the thickness of 0.2 mm. However, since the powder manufactured in the form of a spherical shape should be pulverized into the nano size and made to be flat, the manufacturing process is complicated and the original material is expansive.

As described above, in the conventional technology, in the case of the ferrite or the Permalloy containing the molybdenum used as the magnetic material, these are formed of the crystalline of the spherical shape irrespective of the processing condition. Therefore, complicated processes such as a micro-powdered process and then a flatness process should be undergone in order to manufacture the absorber sheet of the thin thickness of 0.2 mm or less using the ferrite or the Permalloy containing the molybdenum. Moreover, since these conventional materials have the problem that an effective cross-sectional area of the material representing the magnetic property cannot be secured as the thickness of the conventional materials is thinner, it has a limitation in heightening the inductance necessary for securing the distance of the RFID communications. Also, since a thickness of the conventional materials is uneven during manufacturing, the deviation of inductance becomes serious.

Besides, U.S. Pat. No. 6,887,412 describes a composite magnetic sheet and method of producing the same capable of suppressing electromagnetic interference. The composite magnetic sheet includes composite magnetic bodies having flat soft powder subjected to annealing to be free from stress strain and a binder. The composite magnetic sheet is pressed by the press or the rolling mill having the rolls in a direction perpendicular to the plane of the sheet. Further, multiple composite magnetic sheets are stacked by sandwiching Al plate or wire.

However, the magnetic permeability of the magnetic sheet is not high even in the thin thickness below 0.35 mm. While some of the objects and the structural components of U.S. Pat. No. 6,887,412, at first appearance, have similarities with the present invention, U.S. Pat. No. 6,887,412 differs in amorphous alloy powder composition and structural respects. These differences, which will be described in more detail hereinafter, are essential for the effective use of the invention and which admit of the advantages that are not available with the prior devices.

SUMMARY OF THE INVENTION

The inventors have proved the fact that these inventors could manufacture a magnetic sheet having the thin and uniform thickness of 0.35 mm or less in comparison with an existing metal sheet at the low cost with the minimum process, since the magnetic sheet includes an amorphous alloy selected from the group consisting of Fe—Si—B, Fe—Si—B—Cu—Nb, Fe—Zr—B and Co—Fe—Si—B, and an alloy ribbon is directly manufactured into a thin film type of 0.03 mm or less.

Moreover, in the case of the magnetic sheet made of the amorphous alloy, the saturation magnetic flux density 0.57 T-1.6 T is much higher than the saturation magnetic flux density 0.45 T of the existing ferrite, and the magnetic permeability is high even in the thin thickness. Accordingly, the inventors have discovered the fact that the magnetic flux which modulates in the RFID communications can be effectively focused on the transponder antenna coil. In addition, the inventors has discovered the fact that the electromagnetic waves of 0.9 GHz and 1.9 GHz frequency band having no concern with the RFID communications, and the several gigahertz (GHz) band which is the harmonic component of standard communications electromagnetic wave bands, during the communications process of the cellular phone, without having the metal layer, in comparison with the ferrite sheet, can be blocked effectively. The conventional problem can be solved in the case that the magnetic sheet is used as the absorber for the RFID antenna of the portable device including the mobile phone.

Thus, an object of the present invention is to provide a magnetic sheet for a radio frequency identification (RFID) antenna comprising an amorphous alloy consisting of the above-described composition, and a RFID antenna including the magnetic sheet.

To solve the above problems, it is another object of the present invention to provide a magnetic sheet for use in a radio frequency identification (RFID) antenna, an RFID antenna including the magnetic sheet, and a method of manufacturing the magnetic sheet, in which the magnetic sheet is made by laminating amorphous alloy ribbons made of an amorphous alloy between magnetic sheet layers formed of alloy powder including at least one amorphous alloy and then compression-molding the amorphous alloy ribbons, to thereby provide a multilayer structure of a simple process of manufacturing a thin magnetic sheet and having an excellent magnetic permeability.

To accomplish the above object of the present invention, there is provided a magnetic sheet for a radio frequency identification (RFID) antenna comprising having an amorphous alloy of a composition selected from the group consisting of Fe—S—B, Fe—Si—B—Cu—Nb, Fe—Zr—B, and Co—Fe—S—B.

Moreover, according to another aspect of the present invention, there is also provided a magnetic sheet for a radio frequency identification (RFID) antenna comprising an alloy which is obtained by heat-treating an amorphous alloy selected from the group consisting of Fe—Si—B, Fe—Si—B—Cu—Nb, Fe—Zr—B, and Co—Fe—Si—B.

The magnetic sheet according to the present invention can be formed by laminating a magnetic sheet layer formed of a mixture of amorphous alloy powder of the above-described composition and a resin, and a slit amorphous alloy ribbon. Alloys of two or more compositions of the above-described compositions may be mixed in the magnetic sheet.

According to another aspect of the present invention, there is provided a magnetic sheet for a radio frequency identification (RFID) antenna made of amorphous alloy powder including at least one kind of an amorphous alloy selected from the group consisting of Fe—Si—B, Fe—Si—B—Cu—Nb, Fe—Zr—B, and Co—Fe—Si—B and a resin for a binder mixed with the amorphous alloy powder in order to be molded into a sheet form.

The amorphous alloy powder and the binder resin are mixed with a weight ratio in the range of 5:1 through 9:1.

According to still another aspect of the present invention, there is also provided a method of manufacturing a magnetic sheet for a radio frequency identification (RFID) antenna, the magnetic sheet manufacturing method comprising the steps of: mixing amorphous alloy powder including at least one kind of an amorphous alloy selected from the group consisting of Fe—Si—B, Fe—Si—B—Cu—Nb, Fe—Zr—B, and Co—Fe—Si—B and a resin for a binder; and depositing the mixture on a base member in the form of a thin film and then drying the deposited base member, to thereby obtain a dried magnetic sheet.

According to yet another aspect of the present invention, there is also provided a multi-layered magnetic sheet for a radio frequency identification (RFID) antenna, the multi-layered magnetic sheet comprising: first and second magnetic sheet layers made of alloy powder including at least one kind of an amorphous alloy selected from the group consisting of Fe—Si—B, Fe—Si—B—Cu—Nb, Fe—Zr—B, and Co—Fe—Si—B; and a first amorphous alloy ribbon including at least one kind of the amorphous alloys and which is laminated between the first and second magnetic sheet layers.

Preferably, the magnetic sheet for the RFID antenna further comprises: a second amorphous alloy ribbon laminated on the surface of any one of the first and second magnetic sheet layers and made of one kind of the amorphous alloys; and a third magnetic sheet layer which is laminated on the surface of the second amorphous alloy ribbon and manufactured with the alloy powder including at least one kind of the amorphous alloy.

In this case, since the amorphous alloy ribbon laminated between the mixed sheets causes the microcrack to occur through a rolling or a press of the sheet thereby dropping down a loss, the frequency characteristic being the disadvantage of the amorphous alloy ribbon can be enhanced, and a complicated process which is slit in order to use an existing amorphous alloy ribbon. In this case, it is possible that the capacity of a battery is extended in a battery pack of the same thickness or the thickness of the battery pack is made into an ultra thin type, since inductance necessary for RFID communications can be effectively obtained.

According to a yet still another aspect of the present invention, there is provided a method of manufacturing a magnetic sheet for a radio frequency identification (RFID), the magnetic sheet manufacturing method comprising the steps of: preparing first and second magnetic sheet layers made of alloy powder including at least one kind of an amorphous alloy selected from the group consisting of Fe—Si—B, Fe—Si—B—Cu—Nb, Fe—Zr—B, and Co—Fe—Si—B; preparing a first amorphous alloy ribbon made of one kind of the amorphous alloys; and laminating the first amorphous alloy ribbon between the first and second magnetic sheet layers and then compression-molding the laminated multi-layer magnetic sheet layer in order to increase a relative density of the laminated magnetic sheet layer and simultaneously form a microcrack on the first amorphous alloy ribbon.

The method of manufacturing the magnetic sheet for the RFID, further comprises the steps of: preparing a second amorphous alloy ribbon made of one kind of the amorphous alloys and a third magnetic sheet layer made of alloy powder including at least one kind of the amorphous alloys; and before rolling the laminated magnetic sheet layer, laminating the second amorphous alloy ribbon on the surface of any one of the first and second magnetic sheet layers and laminating the third magnetic sheet layer on the surface of the second amorphous alloy ribbon.

Moreover, the step of compression-molding the laminated multilayer magnetic sheet layer can be executed by one of hot rolling, hot pressing, cold rolling, and cold pressing.

It is preferable that the amorphous alloy is heat-treated at the temperature of 300° C. to 600° C. for ten hours or less in order to have the grain size of the nanometer (nm) unit.

The thickness of the multi-layered magnetic sheet can be manufactured in the form of a thin film of 0.2 mm or less.

According to a further aspect of the present invention, there is also provided a magnetic sheet for a radio frequency identification (RFID), the RFID magnetic sheet comprising: a plurality of magnetic sheet layers which is made of alloy powder including at least one kind of an amorphous alloy selected from the group consisting of Fe—Si—B, Fe—Si—B—Cu—Nb, and Fe—Zr—B, and Co—Fe—Si—B; and a plurality of amorphous alloy ribbons which are made of at least one kind of the amorphous alloys and which are laminated between the plurality of magnetic sheet layers.

According to a still further aspect of the present invention, there is also provided a radio frequency identification (RFID) antenna comprising: a multi-layered magnetic sheet including a plurality of magnetic sheet layers which is made of alloy powder including at least one kind of an amorphous alloy selected from the group consisting of Fe—Si—B, Fe—Si—B—Cu—Nb, and Fe—Zr—B, and Co—Fe—Si—B, and a plurality of amorphous alloy ribbons which are made of at least one kind of the amorphous alloys and which are laminated between the plurality of magnetic sheet layers; an insulating layer formed on the surface of the magnetic sheet; and an antenna coil pattern which is patterned on the surface of the insulating layer using a conductive material.

Moreover, the present invention provides a radio frequency identification (RFID) device including a radio frequency identification (RFID) antenna according to another aspect of the present invention.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

Figure 1:
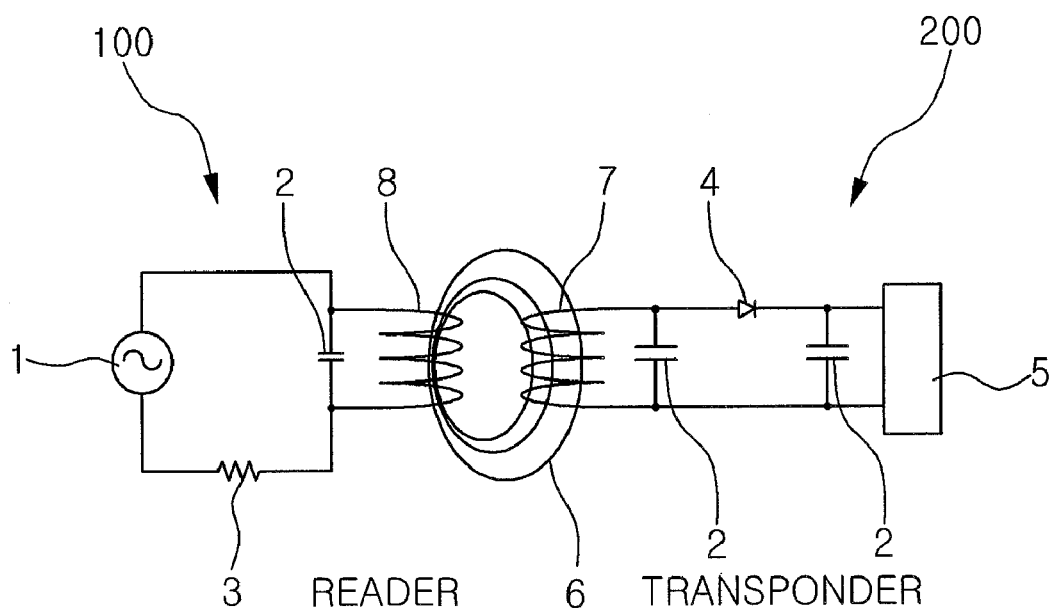
FIG. 1 is a circuit diagram showing a radio frequency identification (RFID) system of an inductive coupling mode.

A magnetic sheet for use in a radio frequency identification (RFID) antenna, a method of manufacturing the same, and a radio frequency identification (RFID) antenna using the magnetic sheet according to preferred embodiments of the present invention will be described below with reference to the accompanying drawings.

It is known that a Fe alloy and an amorphous alloy can be used as a soft magnetic material. In the present invention, a magnetic sheet for an absorber for a radio frequency identification (RFID) antenna of the present invention is manufactured using an amorphous alloy made of a composition material selected from the group consisting of a particular composition among Fe alloys, that is, Fe—Si—B, Fe—Si—B—Cu—Nb, Fe—Zr—B, and Co—Fe—Si—B. Accordingly, the problem of the conventional technique can be resolved. Detailed description thereof will follow.

In the case that an amorphous alloy made of a composition material selected from the group consisting of Fe—Si—B, Fe—Si—B—Cu—Nb, Fe—Zr—B, and Co—Fe—Si—B is used, a magnetic sheet having a thin and uniform thickness of 0.35 mm or less can be manufactured. In the case of ferrite or Permalloy containing molybdenum used as a magnetic material in the conventional technology, these form a spherical crystalline structure irrespective of a processing condition. Therefore, complicated processes such as a micro-powdered process and then a flatness process should be undergone in order to manufacture the sheet of the thin thickness of 0.35 mm or less using the ferrite or the Permalloy containing the molybdenum. Moreover, since these conventional materials have the problem that an effective cross-sectional area of the material representing the magnetic property cannot be secured as the thickness of the conventional materials is thinner, it has a limitation in heightening the inductance necessary for securing the distance of the RFID communications. Also, since a thickness of the conventional materials is uneven during manufacturing, the deviation of inductance becomes serious.

However, since the model of the alloy which is used in the present invention is in the form of an amorphous ribbon shape, it can be easily fabricated into a sheet of a thin thickness of 0.35 mm or less. In addition, the thickness of the sheet can be easily uniformly controlled. Therefore, since the present invention uses a thin and uniform magnetic sheet as an absorber for a radio frequency identification (RFID) antenna, the deviation of inductance is minimized and the tuning of an LC resonance circuit can be facilitated. An error occurring in the process of the formation and transmission of binary code data during the mutual transmission process of data can be reduced. In addition, the manufacturing process of the magnetic sheet becomes simple and the manufacturing cost becomes inexpensive.

Moreover, although the conventional magnetic sheet materials have to include the separate metal layer in order to block the externally generated electromagnetic wave having no connection with the RFID communications, the amorphous alloy according to the present invention can focus the inductive electromagnetic wave of 135 kHz or less or 13.56 MHz on the tag antenna coil and simultaneously block the electromagnetic wave to the several gigahertz (GHz) band having no relation with the RFID communications. Therefore, in the case of manufacturing the magnetic sheet for the RFID antenna using the amorphous alloy according to the present invention, a separate layer such as the metal layer for blocking the external electromagnetic wave has no need to be included.

The amorphous alloy of the composition according to the present invention can be manufactured by mixing material-components for making the composition aiming at the alloy of the present invention and then rapidly cooling the composition at the speed of $10^6$ K/s. However, the manufacturing method is not limited thereto, but any method of manufacturing an amorphous alloy can be used.

It is preferable that the amorphous Fe—Si—B alloy is made of Fe of 70-90 atomic %, and the sum total of Si and B of 10-30 atomic %. As the content of metal including Fe becomes high, the saturation magnetic flux density becomes high, but when the content of Fe is excessive, it is difficult to constitute the amorphous alloy. As a result, it is preferable that the content of Fe is 70-90 atomic % in the present invention. Also, when the sum total of Si and B is in the range of 10-30 atomic %, the amorphous formation capability of alloy is most excellent. In order to prevent corrosion, a corrosion-resistant element such as Cr can be added in the basic composition of the alloy within the range of several atomic %.

Moreover, it is preferable that the Fe—Si—B—Cu—Nb alloy in the present invention includes Fe of 73-80 atomic %, and the sum total of Si and B of 1-5 atomic %. In the composition range, the amorphous alloy which has been manufactured in the form of a ribbon can be easily educed into a nanophase grain by a thermal process which will be described later.

It is preferable that the Fe—Zr—B alloy in the present invention includes Fe of 85-93 atomic %, Zr of 5-10 atomic % and B of 2-5 atomic %. In the composition range, the Fe—Zr—B alloy can be easily educed into the nanophase grain by a thermal process which will be described later.

It is preferable that the Co—Fe—Si—B alloy in the present invention includes Co of 71-85 atomic %, and the sum total of Si and B of 12-21 atomic %. As necessary, a raw material such as Mo, Cr, and Ni may be added to the Co—Fe—Si—B alloy within several atomic %. Here, it is preferable that the sum total of the contents of Cr and Ni is within 2-7 atomic %. As the Co content is low, the peak flux density is low but the magnetic permeability is very high. Accordingly, it is advantageous that the content of Co is low in order to obtain a high inductance. However, since the bias property due to the DC (direct current) current is greatly changed according to the Co content, the Co content should be considered in connection with a system.

For example, the magnetic sheet for the RFID antenna according to the present invention can be manufactured as follows. Fe—B or Co—B is mixed as a starting material for achieving a composition which is selected from the group consisting of Fe—Si—B, Fe—Si—B—Cu—Nb, Fe—Zr—B and Co—Fe—Si—B. Here, a raw material such as Si, Cu, Nb, Zr, Mo, Cr, and Ni is selectively mixed with the composition which has been selected from the group consisting of Fe—Si—B, Fe—Si—B—Cu—Nb, Fe—Zr—B and Co—Fe—Si—B and has been mixed with Fe—B or Co—B, in order to fit for the composition, and then be made into a metal molten body of a high temperature using a high-frequency induction furnace. Here, the added raw material may be formed of any of powder, granule and lump.

Then, a ribbon type amorphous alloy which has a continuous film form of a thin thickness is manufactured by rapidly cooling the metal molten body at a speed of $10^6$ K/s or greater. Thereafter, the amorphous alloy ribbon is pulverized using a pulverization method which is known to one skilled in the technical field including a ball mill, in order to obtain amorphous alloy powder. The amorphous alloy powder has a flat type shape of a thin thickness in the form of a thin film. The flat type shape may be replaced by any of a circular, rectangular, and needle shape. The present invention is not restricted to the form of the alloy powder.

Then, the amorphous alloy powder which has been manufactured as described above, is mixed with a resin for a binder. In this case, in order to control a viscosity if necessary, polyvinyl alcohol, alcohol and the other volatile solvent is added and mixed with the amorphous alloy powder which has been mixed with the binder resin. For example, rubber, polyimide, polyamide, urethane, silicon, phenol resin, etc., can be used as a resin in the present invention. But, the present invention is not limited thereto. It is preferable that a mixing ratio of the amorphous alloy powder and the resin is selected between 5:1 and 9:1. It is difficult to obtain an inductance needed for the RFID communications in the case that the mixing ratio is 5:1 or less. It is difficult to manufacture a magnetic sheet in the case of the mixing ratio of 9:1 or greater. The mixed powder is coated on a base material in the form of a thin film of a thickness of 0.35 mm or less and then dried. Thereafter, the base material is separated from the thin film to thus manufacture a magnetic sheet. The magnetic sheet is cut to fit for a desired antenna size to then be used a magnetic sheet for the RFID antenna according to the present invention.

In the case of the manufacturing method of the magnetic sheet for the RFID antenna according to the present invention, the amorphous alloy ribbon of the composition according to the present invention or the amorphous alloy powder which is obtained by pulverizing the amorphous alloy ribbon is heat-treated, to thereby improve a magnetic property or the grain size is micronized in size of nanometers, preferably about 10 nm to thereby make a magnetic property excellent. In the case of manufacturing the magnetic sheet for the RFID antenna according to the invention using the alloy manufactured in this way, a high-frequency property of the magnetic sheet can be improved. It is preferable that the thermal treatment in the present invention is performed at a thermal treatment temperature of 300° C. to 600° C., and within a thermal treatment time of 10 hours at maximum.

As shown in FIGS. 2A through 5C, the RFID antenna 30 according to the present invention basically includes an antenna coil 9 and a magnetic sheet for a radio frequency identification (RFID) antenna. In this case, the RFID antenna 30 according to the present invention can be built in an insulation case made of an injection molding material such as plastic, PBT (Polybutylene Telephthalate), and PET (Polyethylene Telephthalate) and the other materials of the similar kind thereof.

In the present invention, the antenna coil 9 can be manufactured with a material and a method which are known to people who has an ordinary skill in the art. For example, various kinds of methods including a method which includes the step of forming a metal film whose electrical conductivity is high on a base plate including an insulating film and forming a coil with an etching or punching method. Also, a copper-clad laminate of a printed circuit board can be used for the antenna coil 9.

Figure 2A:
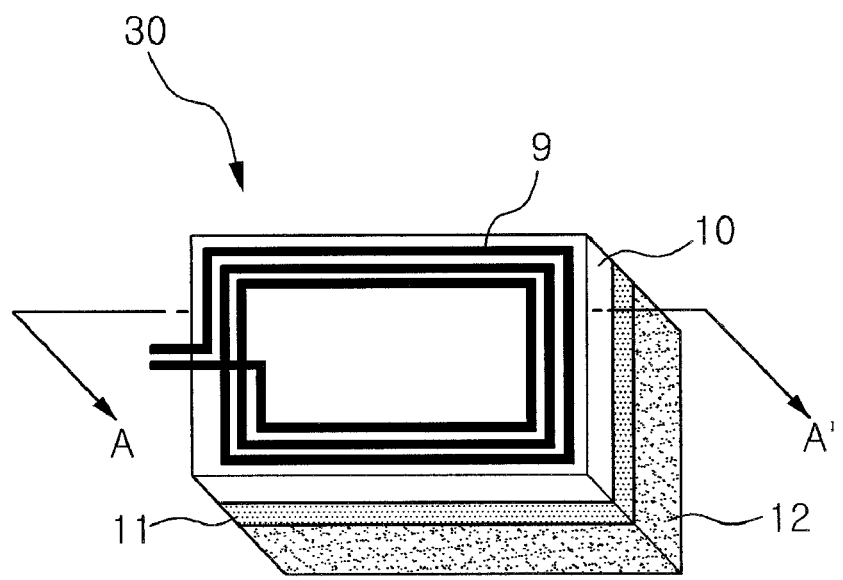
FIG. 2A is a perspective view showing structure of a radio frequency identification (RFID) antenna including a magnetic sheet for an absorber of a mono-layer structure in which the magnetic sheet is manufactured using amorphous alloy powder, according to a first embodiment of the present invention.

As shown in FIG. 2A, the antenna coil 9 of the RFID antenna 30 according to the present invention can be formed in the form of a swirl pattern horizontally on the plane. In FIG. 2A, the swirl pattern of the antenna coil 9 is illustrated in the form of a rectangular shape. But, the swirl pattern of the antenna coil 9 can be formed of various kinds of the structures of any form of a circular shape, or a hybrid shape which is obtained by mixing a rectangular shape and a circular shape. In the case of the antenna coil for a transponder, a copper thin plate on which the resin is coated thin can be used. In order to make the total thickness thin. It is preferable that an insulating layer 10 forming the antenna coil 9 in the present invention is formed of 0.15 mm or less thick.

Figure 2B:
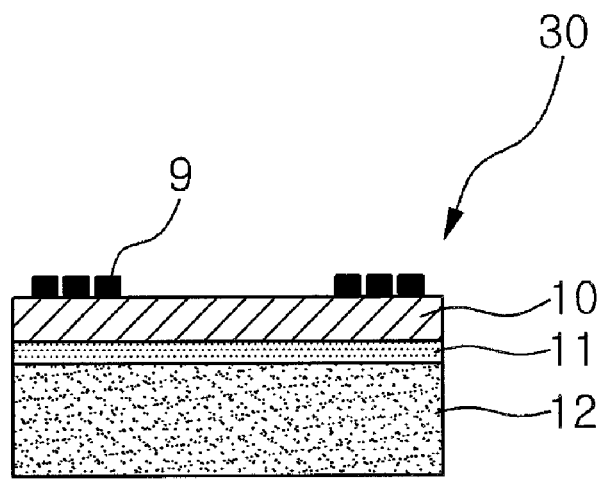
FIG. 2B is a cross-sectional view of a line A-A' of FIG. 2A.

The magnetic sheet for the RFID antenna according to the present invention can be made of a magnetic sheet layer 12 of a mono-layer structure which is formed by mixing the amorphous alloy powder and resin according to a first embodiment of the present invention as illustrated in FIGS. 2A and 2B.

In this case, the antenna coil 9 formed on the insulating layer 10 and the magnetic sheet layer 12 of the mono-layer structure are integrated by a bonding layer 11 in the RFID antenna 30 according to the first embodiment of the present invent ion.

In the present invention, a double sided tape can be used as the bonding layer 11 for bonding the antenna coil 9 and the magnetic sheet layer 12 for an absorber. However, the present invention is not limited thereto, but various kinds of methods for bonding the antenna coil and the magnetic sheet layer can be used within the range that does not limit the performance of the RFID antenna.

Moreover, in the case of using a resin-coated flexible and thin printed circuit board in order to make the antenna coil 9, the magnetic sheet, especially the magnetic sheet made of the alloy ribbon can be adhered to the printed circuit board without adding a separate adhesive. The resin-coated flexible and thin printed circuit board means that a partially hardened prepreg resin has been coated on both surfaces of an insulation plate formed of preferably the thickness is 0.15 mm or less, and made of phenol/polyimide.

Figure 5A:
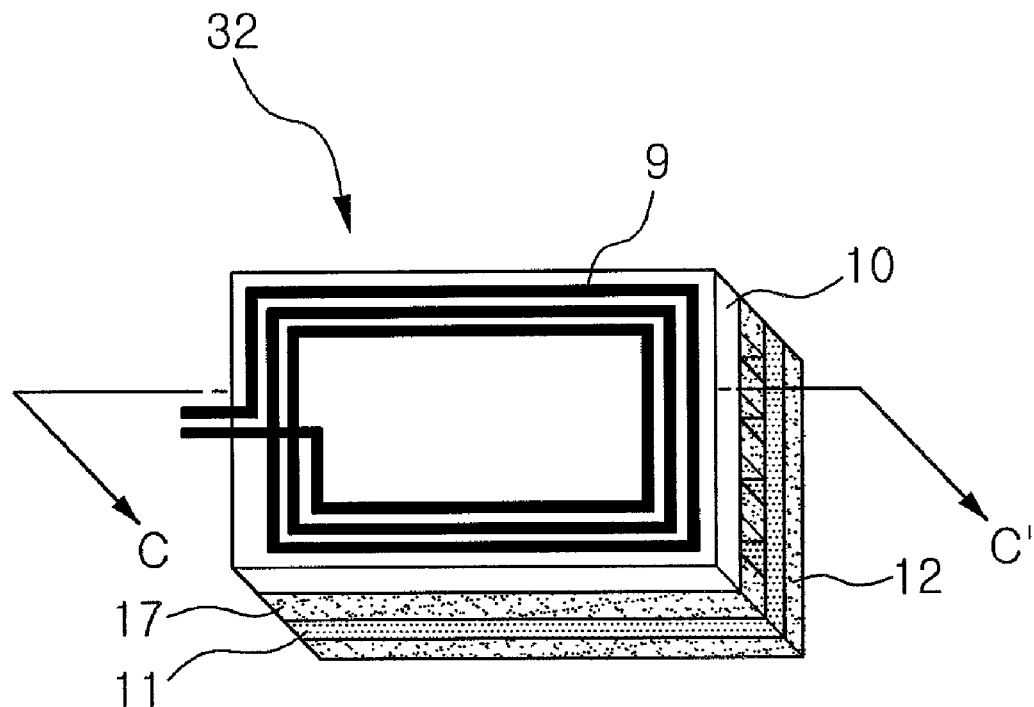
FIG. 5A is a perspective view showing structure of a radio frequency identification (RFID) antenna including a magnetic sheet layer formed by laminating a magnetic sheet layer made of amorphous alloy powder and a slit-type amorphous alloy ribbon according to a fourth embodiment of the present invention.
Figure 5B:
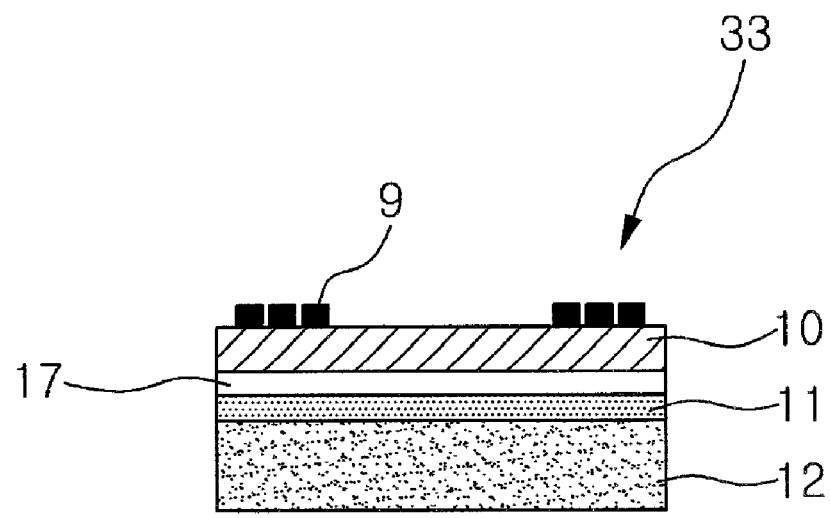
FIG. 5B is a cross-sectional view of a line C-C' of the FIG. 5A.
Figure 5C:
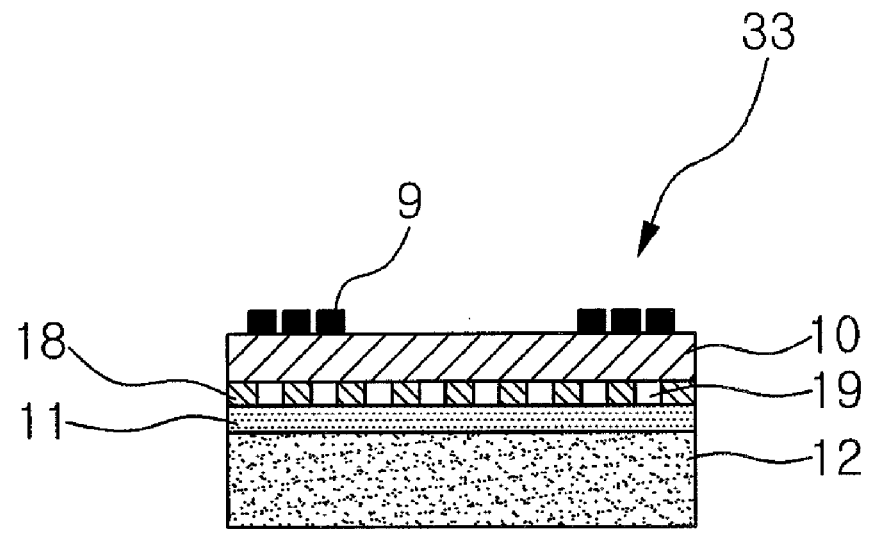
FIG. 5C is a cross-sectional view showing structure of a radio frequency identification (RFID) antenna including a modified magnetic sheet formed by laminating a magnetic sheet layer made of amorphous alloy powder and a slit-type amorphous alloy ribbon according to the fourth embodiment of the present invention.

Moreover, the magnetic sheet for the RFID antenna according to the present invention can be formed of the form of laminating the magnetic sheet layer 12 which is obtained by mixing the amorphous alloy powder and the resin and slit amorphous alloy ribbons 13, 14, and 16 according to a second embodiment shown in the FIGS. 3A through 3E and a fourth embodiment illustrated in FIGS. 5A through 5C. Here, as shown in the drawings, the slit amorphous alloy ribbons 13, 14, and 16 can be patterned in various forms.

Figure 3A:
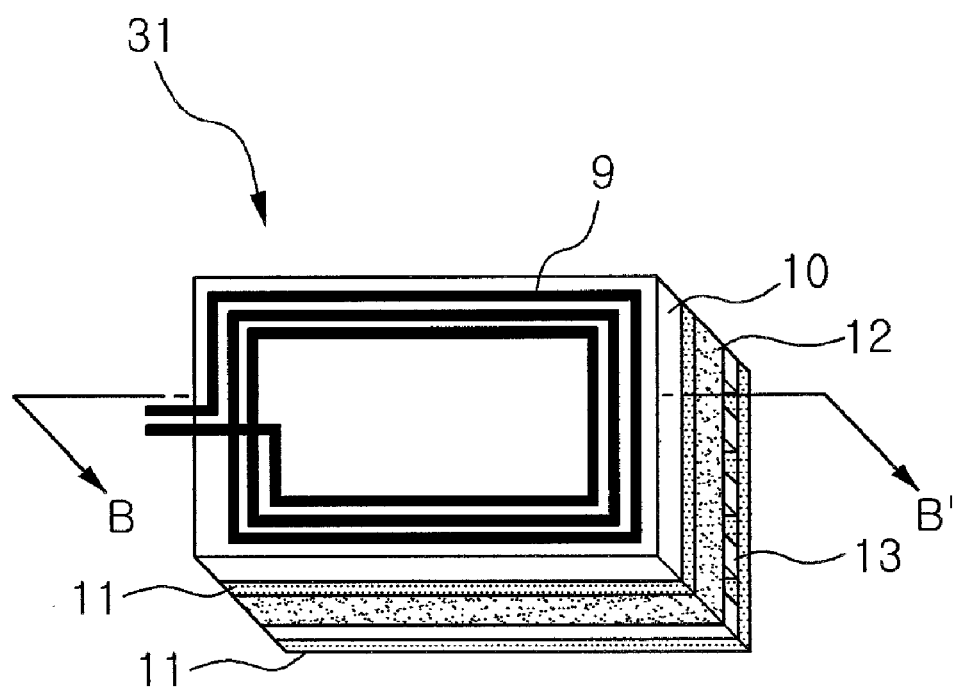
FIG. 3A is a perspective view showing structure of a radio frequency identification (RFID) antenna including a magnetic sheet formed by laminating a magnetic sheet layer made of amorphous alloy powder and a slit-type amorphous alloy ribbon according to a second embodiment of the present invention.
Figure 3B:
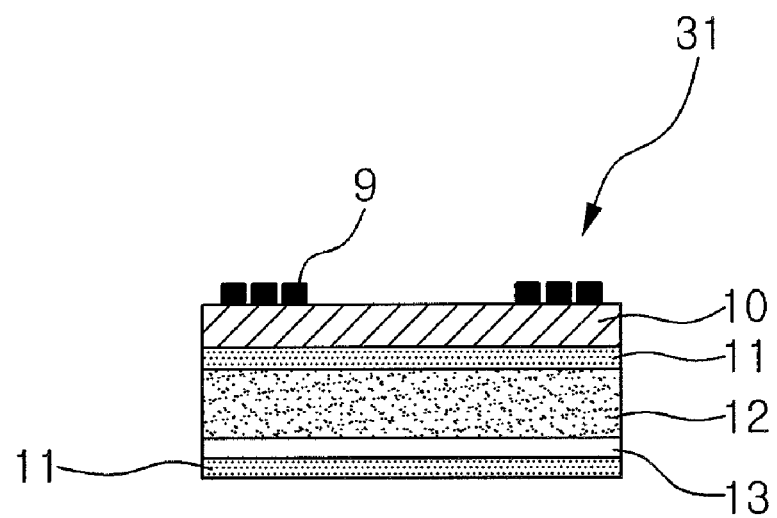
FIG. 3B is a cross-sectional view of a line B-B' of FIG. 3A.

FIG. 3A is a perspective view showing structure of a radio frequency identification (RFID) antenna including a magnetic sheet formed by laminating a magnetic sheet layer made of amorphous alloy powder and a slit-type amorphous alloy ribbon according to a second embodiment of the present invention. FIG. 3B is a cross-sectional view of a line B-B' of FIG. 3A.

For example, in a RFID antenna 31 of the second embodiment illustrated in FIGS. 3A and 3B, in order to focus radio frequency electromagnetic waves radiated from the reader antenna onto the antenna coil 9 of the antenna 30 of the first embodiment, in addition to of the above-described antenna 30 of the first embodiment, a plurality of amorphous alloy ribbons 13 each whose thickness is 0.3 mm or less are laminated on the lower surface of the magnetic sheet layer 12 which is made of the amorphous alloy powder. In the case of the amorphous alloy ribbons 13, a plurality of slit ribbons each having a width of the range of 10 mm or less are, for example, arranged in parallel with the longitudinal direction of the RFID antenna 31 at a predetermined interval 15.

Figure 6:
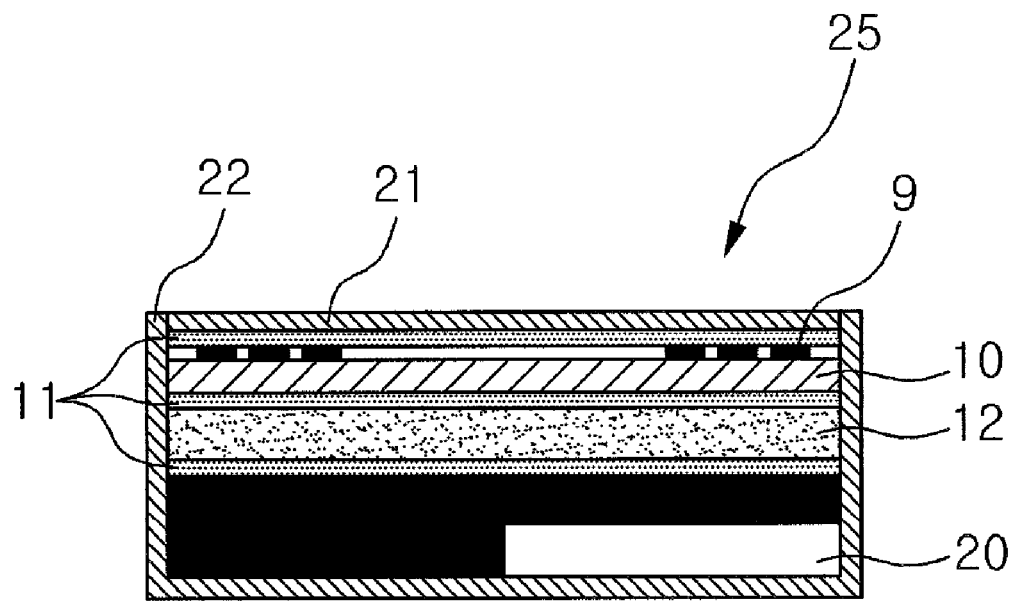
FIG. 6 is a schematic sectional view of a cellular-phone battery including a radio frequency identification (RFID) antenna according to the first embodiment of the present invention.

A bonding layer 11 is inserted. between an insulating layer 10 on which the antenna coil 9 is formed and a magnetic sheet layer 12. Also, another bonding layer 11 is formed on the lower surface of the magnetic sheet layer 12 so as to be fixed to a battery pack when a battery is accommodated in a battery case as shown in FIG. 6.

Figure 3C:
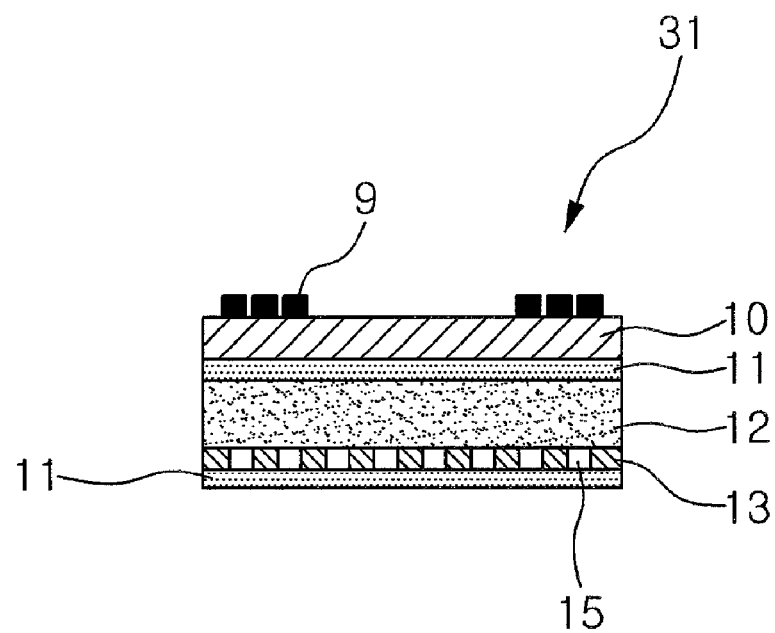
FIGS. 3C through 3E are a cross-sectional view showing structure of a radio frequency identification (RFID) antenna including a modified magnetic sheet formed by laminating a magnetic sheet layer made of amorphous alloy powder and a slit-type amorphous alloy ribbon according to the second embodiment of the present invention, respectively.
Figure 3D:
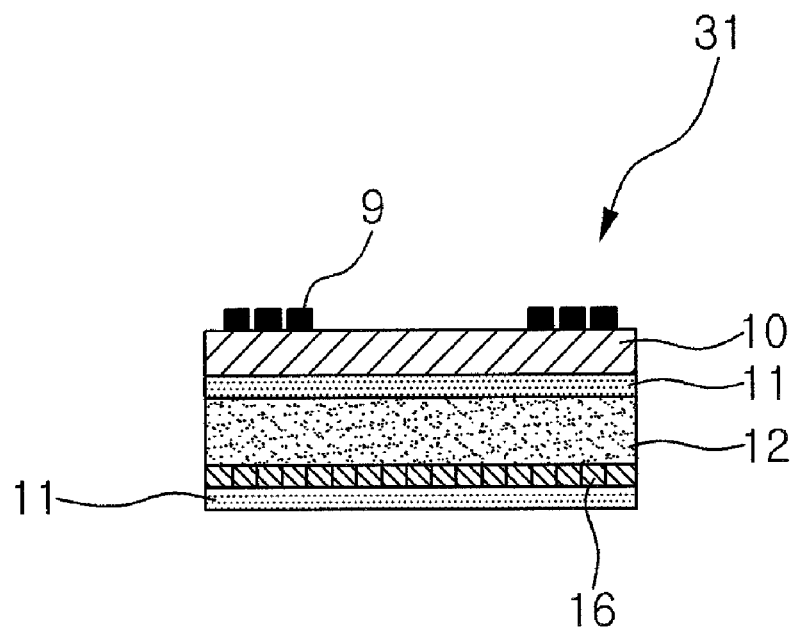
Figure 3E:
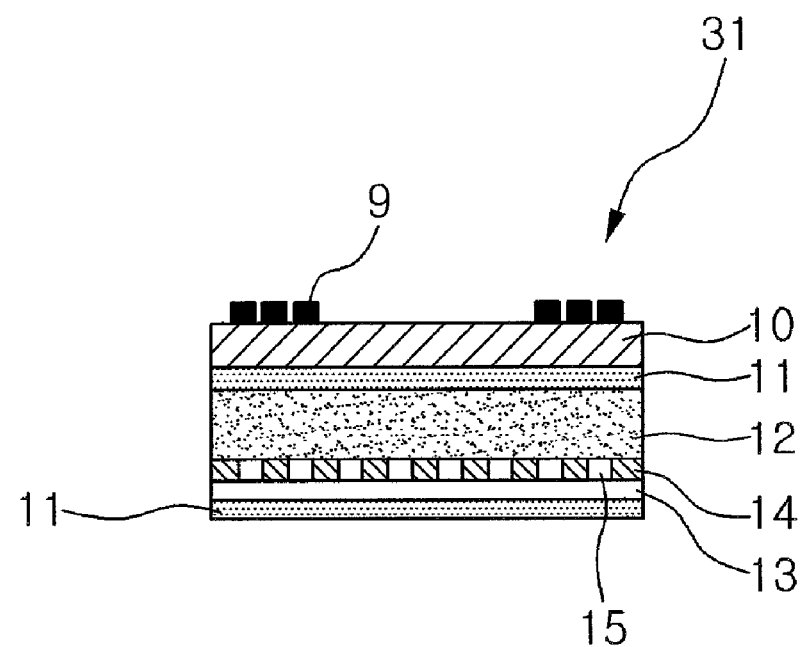

A structure shown in FIG. 3C is a modified example similar to the second embodiment of FIGS. 3A and 3B. The structure of FIG. 3C has a configuration that a plurality of slit alloy ribbons 14 are arranged on the lower portion of the bonding layer 11 in parallel with the direction in which the length of the RFID transponder antenna 31 is shorter. FIG. 3D shows another modified embodiment of the second embodiment in which a plurality of slit alloy ribbons 16 are arranged adjacent one another without having an interval of a space between the ribbons on the lower portion of the bonding layer 11. A modified embodiment shown in FIG. 3E is an example that a plurality of slit alloy ribbons 13 and 14 are arranged so as to be stacked at right angle over each other.

Figure 4A:
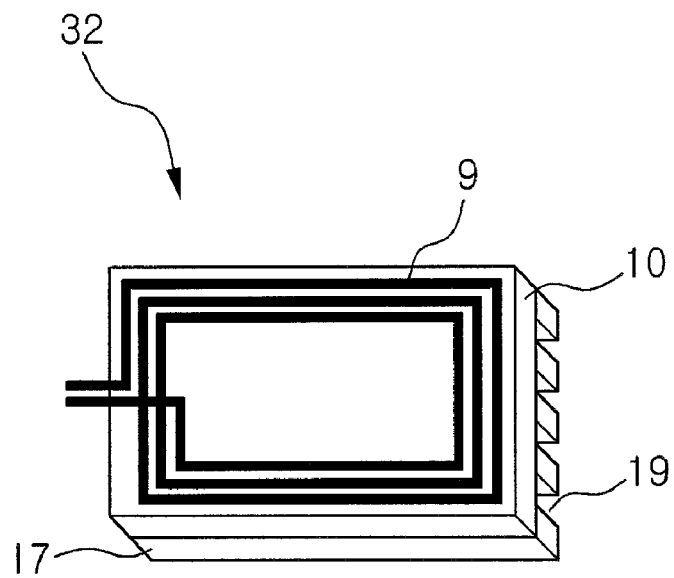
FIGS. 4A and 4B is a perspective view showing structure of a radio frequency identification (RFID) antenna including a slit-type amorphous alloy ribbon for use in an absorber according to a third embodiment of the present invention, respectively.
Figure 4B:
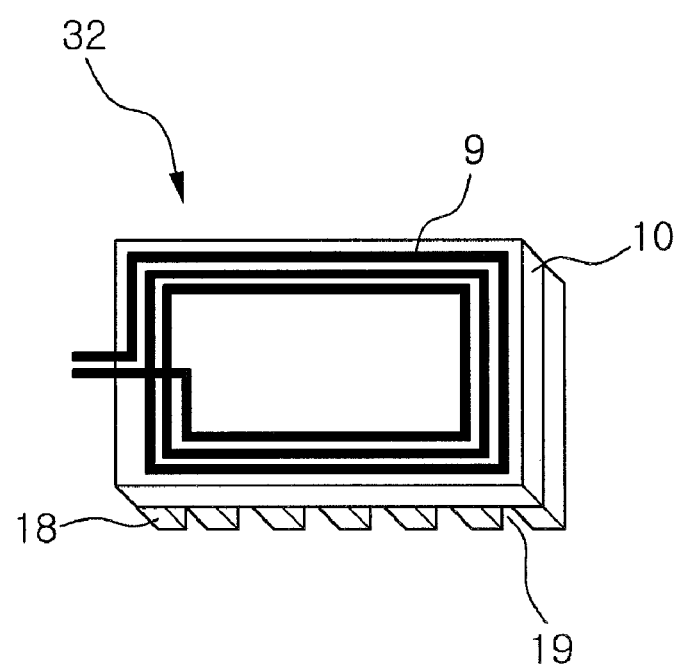

In the meantime, the RFID antenna 32 of the third embodiment illustrated in FIGS. 4A and 4B is an example of the structure where a plurality of slit alloy ribbons 17 are arranged with an interval of a space 19 on the lower portion of an insulating layer 10 on the upper surface of which an antenna coil 9 is provided.

Moreover, a plurality of slit alloy ribbons 17 are arranged with an interval of a space 19 on the lower portion of the insulating layer 10 on the upper surface of which an antenna coil 9 is provided in a fourth embodiment shown in FIGS. 5A through 5C in the lengthy and width direction of an antenna 33. A magnetic sheet layer 12 is adhered to the lower portion of the plurality of slit alloy ribbons 17 through a bonding layer 11.

The antenna 33 of the fourth embodiment shown in FIG. 5A reveals the substantially same inductance as that of the antenna 31 of the second embodiment shown in FIG. 3A.

In the third and fourth preferred embodiments, a method of slitting amorphous alloy ribbons and then arranging the same on a flexible substrate coated with a resin to then bonding the alloy ribbons 17 using a hot press, or a method of bonding the wide ribbons in size of the insulation layer 10 including the antenna coil 9, and then etching and patterning the same can be used as a method of bonding the alloy ribbons 17 and 18 to the insulating layer 10 provided with the antenna coil 9. Here, the bonding and patterning method is not limited to a specific method.

As described above, since the antenna 30-33 may effectively obtain the inductance necessary for the RFID communications in the case of laminating the magnetic sheet layer 12 and a plurality of slit alloy ribbons 13, 14, 16, 17 and 18 of the respectively different kinds, a battery capacity may extend in the identical thickness of a battery pack, or the thickness of the battery pack may be made of an ultra thin type.

A method of improving the performance of the battery pack for the thickness thereof follows.

A method of raising the dielectric constant of a material used for a battery in a given thickness of the battery, and extending the electric capacity;

A method of reducing the thickness of the bonding layer 11 such as an adhesive double-sided tape, into the thickness thinner than a currently used thickness, for example, 0.1 mm, 0.03 mm, or 0.018 mm;

A method of reducing the thickness of the magnetic sheet 12 into the thickness thinner than a currently used thickness, for example, 0.35~0.4 mm but maintaining the same performance as that of the existing thickness;

A method of reducing the thickness of the insulating layer 10 in the printed circuit board into the thickness thinner than that of the existing insulating layer, for example, 0.17~0.2 mm; and A method of treating the material of the antenna coil 9 with silver (Ag) or paste including silver (Ag) having a higher electrical conductivity than copper, and reducing the thickness of the copper plate into the thickness thinner than that of the existing copper plate.

A method which is obtained by combining two kinds or more of the above-described methods, may be used. In the case of using these kinds of the methods, the battery pack including the antenna for the RFID transponder has a life time which can be enhanced by 20~30% in comparison with the traditional battery pack of the same thickness.

The RFID antenna according to the present invention can be mounted in an apparatus using a radio frequency identification (RFID) system. The RFID antenna can be applied to both a reader/writer and a transponder but is not limited specially to the kind of the apparatus using a radio frequency identification (RFID) system. Particularly, the RFID antenna according to the present invention includes a thin magnetic sheet. Therefore, in the case of mounting the RFID antenna in a portable apparatus having a radio recognition function, the RFID antenna according to the present invention is very useful. For example, the RFID antenna according to the present invention can be mounted on a battery unit of a mobile phone, and this kind of the embodiment is exemplified in FIG. 6.

FIG. 6 is a schematic sectional view of a cellular-phone battery including a radio frequency identification (RFID) antenna according to the first embodiment of the present invention. The cellular-phone battery 25 equipped with the RFID antenna is provided with a battery cell 20 which is arranged at the side contacting the main body of the cellular phone inside battery cases 21 and 22. A magnetic sheet 12 and an insulating layer 10 including an antenna coil 9 thereon are laminated on top of a battery cell 20 through an insulating layer 11.

As described above, the RFID antenna according to the present invention can be applied to various types of apparatuses such as a PDA (Personal Digital Assistant), a notebook computer, a traffic card, a credit card, and an entrance card with a method which is similar to that of being applied to a battery of a mobile phone.

Figure 7:
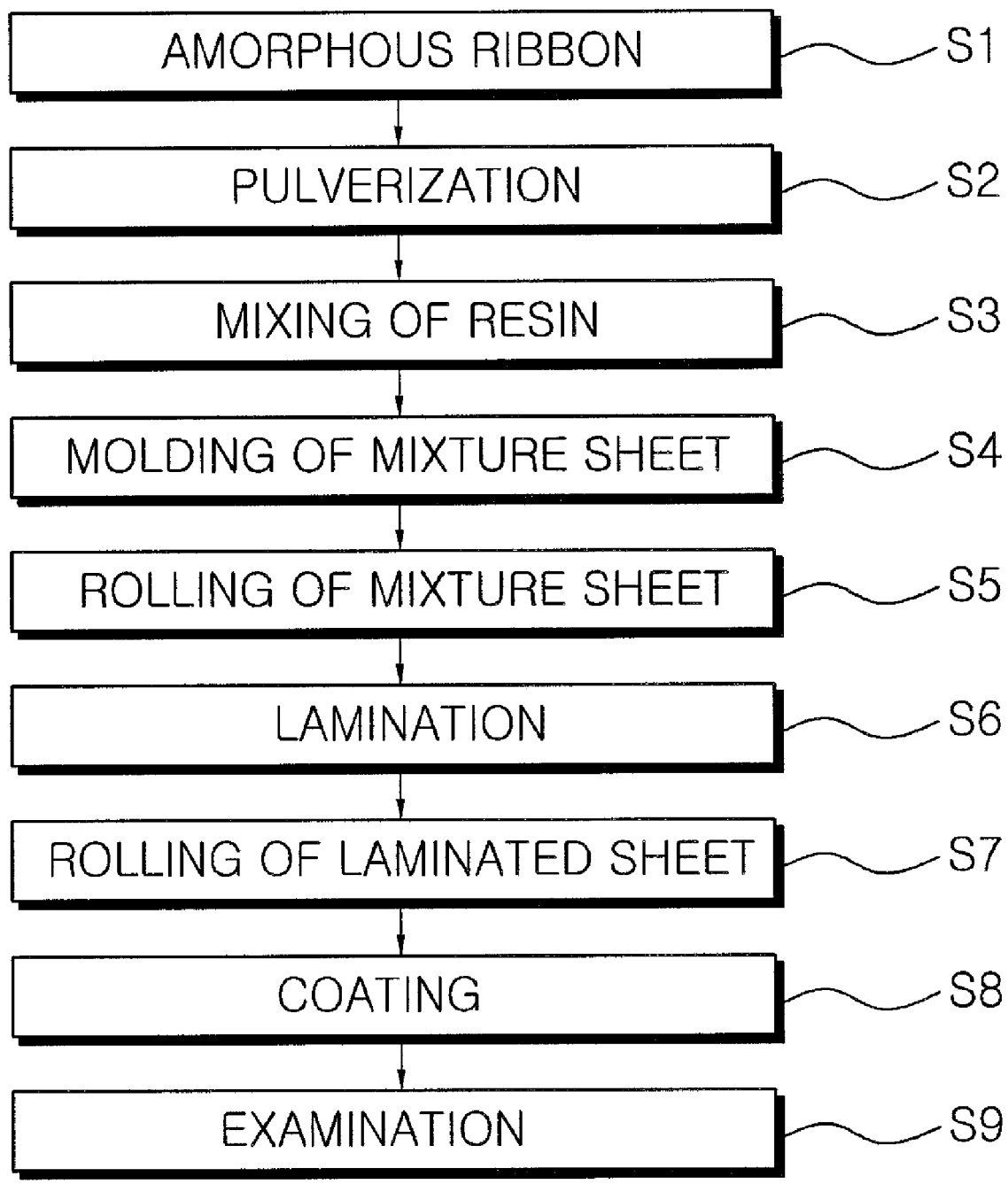
FIG. 7 is a flow-chart view for illustrating a manufacturing method of a magnetic sheet for use in a radio frequency identification (RFID) antenna according to a preferred fifth embodiment of the present invention.

FIG. 7 is a flow-chart view schematically illustrating a manufacturing method of a multilayer magnetic sheet for use in a radio frequency identification (RFID) antenna according to a preferred fifth embodiment of the present invention.

The multilayer magnetic sheet for the RFID antenna according to the fifth embodiment of the present invention is manufactured as follows. Fe—B or Co—B is mixed as a starting material for achieving a composition which is selected from the group consisting of Fe—Si—B, Fe—Si—B—Cu—Nb, Fe—Zr—B and Co—Fe—Si—B. Here, a raw material such as Si, Cu, Nb, Zr, Mo, Cr, and Ni is selectively mixed with the composition which has been selected from the group consisting of Fe—Si—B, Fe—Si—B—Cu—Nb, Fe—Zr—B and Co—Fe—Si—B and has been mixed with Fe—B or Co—B, in order to fit for the composition, and then be made into a metal molten body of a high temperature using a high-frequency induction furnace. Here, the added raw material may be formed of any of powder, granule and lump. Then, a ribbon type alloy, that is, an amorphous alloy ribbon is manufactured by extruding and rapidly cooling the metal molten body at a speed of $10^6$ K is or greater (S1). Here, the ribbon type means a continuous thin film pattern of the thin thickness.

Thereafter, the ribbon alloy is pulverized using a pulverization method which is known to one skilled in the technical field including a ball mill, in order to obtain alloy powder (S2). The alloy powder has a flat type shape of a thin thickness in the form of a thin film. The flat type shape may be replaced by any of a circular, rectangular, and needle shape. The present invention is not restricted to the form of the alloy powder.

The amorphous alloy ribbon which is inserted into the powder or sheet which is manufactured as described above is heat-treated, to thereby release stresses occurring at the time of pulverizing amorphous alloy and to thus improve a magnetic property, or in the case of the amorphous alloy of the composition of Fe—Si—B—Cu—Nb, the grain size is micronized in size of nanometers, preferably about 10 nm to thereby make a magnetic property excellent. In the case of manufacturing the magnetic sheet for the RFID antenna according to the invention using the alloy manufactured in this way, a high-frequency property of the magnetic sheet can be improved. It is preferable that the thermal treatment in the present invention is performed at a thermal treatment temperature of 300° C. to 600° C., and within a thermal treatment time of 10 hours at maximum.

Then, the alloy powder which has been manufactured as described above, is mixed with a resin. In this case, in order to control a viscosity if necessary, the volatile solvent such as polyvinyl alcohol, alcohol and toluene is added and mixed with the alloy powder which has been mixed with the binder resin (S3). For example, rubber, polyimide, polyamide, urethane, silicon, phenol resin, acryle etc., can be used as a resin in the present invention. But, the present invention is not limited thereto. It is preferable that a mixing ratio of the alloy powder and the resin is selected between 5:1 and 9:1. The mixed powder and resin is coated in the form of a thick film of a thickness of 0.5 mm or less and then dried.

Figure 8:
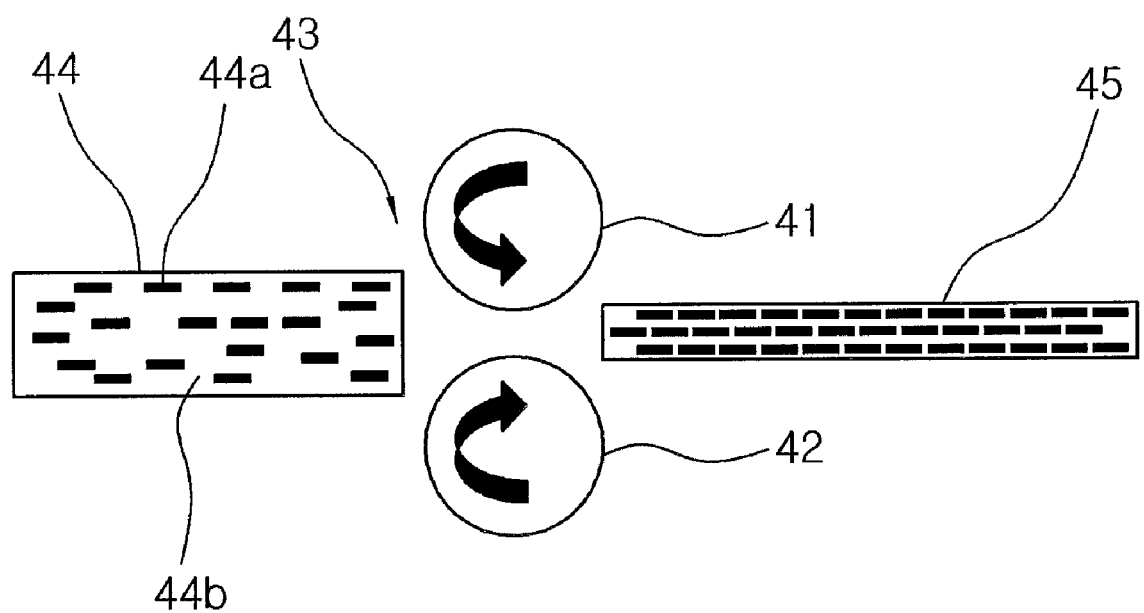
FIG. 8 is an illustrative view for illustrating a rolling process of a mixture sheet molded in FIG. 7.

FIG. 8 is an illustrative view for illustrating a rolling process of a mixture sheet molded in FIG. 7. The mixture sheet 44 of the dried amorphous alloy powder 44a and the resin 44b (hereinafter referred to as "mixture sheet") is manufactured into a primarily compressed magnetic sheet layer 45 in a manner of continuously passing a compression-molding roll 43 made of a pair of an upper roll 41 and a lower roll 42, for example, in order to heighten a density of the amorphous alloy powder as shown in FIG. 5 (S4).

The method of compressing the mixture sheet can be performed using any of a hot rolling, a hot pressing, a cold rolling or a cold pressing. The hot rolling can be performed at a temperature of 70° C. for example.

Figure 9:
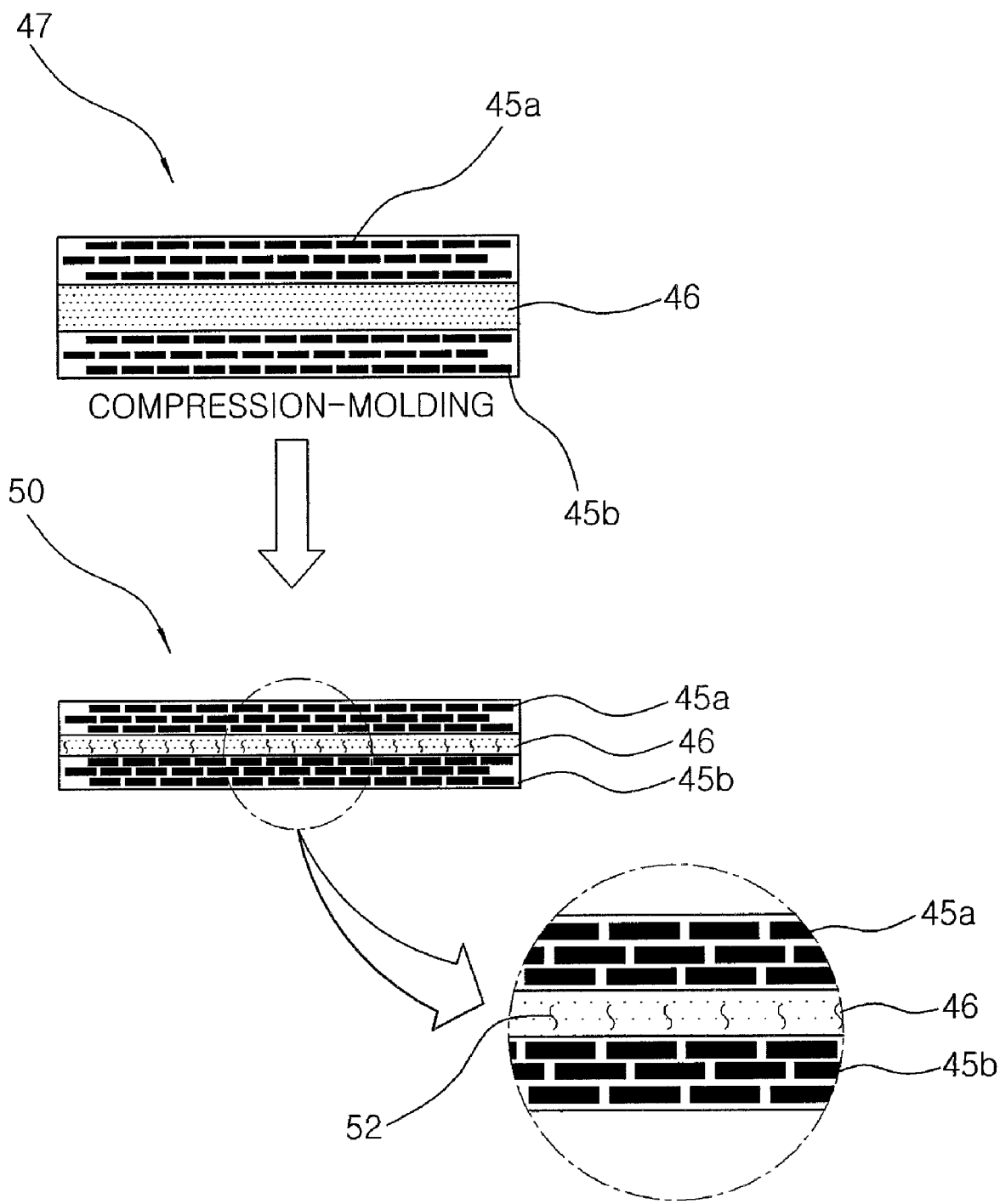
FIG. 9 is a sectional view for illustrating a compression-molding process of a magnetic sheet for use in a radio frequency identification (RFID) antenna according to the preferred fifth embodiment of the present invention.

FIG. 9 is a sectional view for illustrating a compression-molding process of a magnetic sheet for use in a radio frequency identification (RFID) antenna according to the preferred fifth embodiment of the present invention. Firstly, an amorphous alloy ribbon 46 is laminated between a pair of primarily compressed magnetic sheet layers 45a and 45b through a rolling or pressing process (S6).

In this case, the amorphous alloy ribbon 46 has a composition which is selected from the group consisting of Fe—Si—B, Fe—Si—B—Cu—Nb, Fe—Zr—B, and Co—Fe—Si—B and is cut in the same size as those of the primarily compressed magnetic sheet layers 45a and 45b to then bond the cut amorphous alloy ribbon 46 using a resin.

Thereafter, the laminated multilayer sheet 47 undergoes a secondary compression-molding using a pressing or rolling process under the condition of a cold or hot atmosphere in the same as that of the primary compression-molding, to obtain a magnetic sheet 50 having a multi-layered structure (S7).

The magnetic sheet 50 of the above-described first embodiment is made of a tripple-layer structure including a pair of the primarily compressed magnetic sheet layers 45a and 45b and an amorphous alloy ribbon 46. For example, the magnetic sheet 50 can be formed of the thickness of 0.2 mm or less.

After completion of the compression-molding of the multilayer magnetic sheet 50, for example, the material of the resin system including acryl, polyurethanes, phenol, etc., of 20 μm is coated on the surface of the multilayer magnetic sheet in order to prevent oxidation, and a test for characteristics is performed (S8 and S9).

Figure 10:
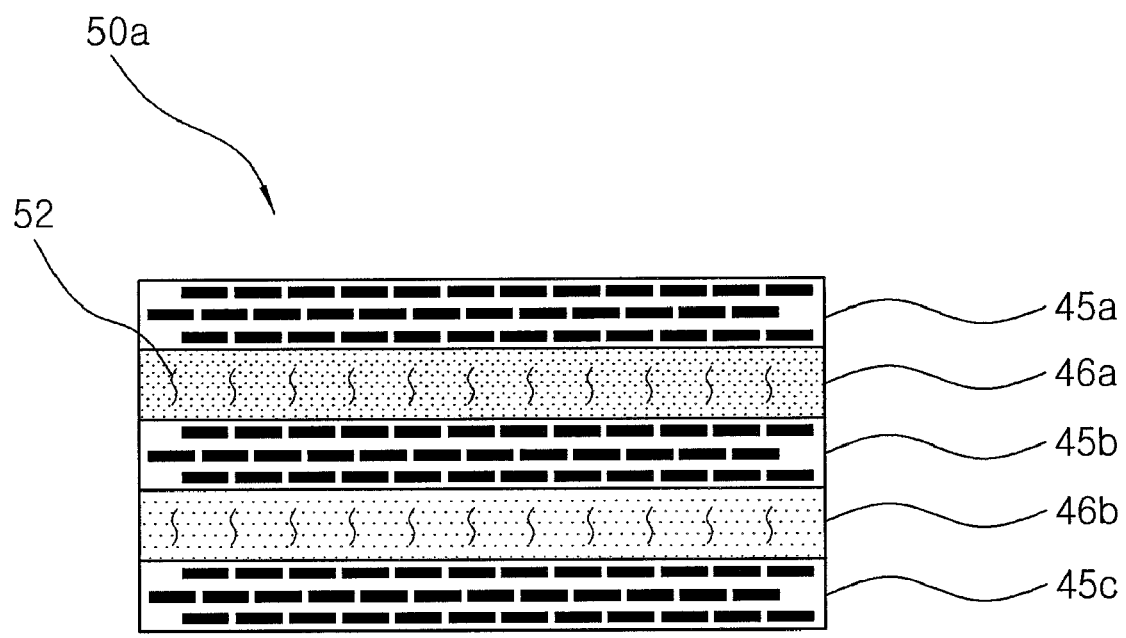
FIG. 10 is a cross-sectional view of a modified magnetic sheet for use in a radio frequency identification (RFID) antenna according to the preferred sixth embodiment of the present invention.

FIG. 10 is a cross-sectional view of a modified magnetic sheet for use in a radio frequency identification (RFID) antenna according to a preferred sixth embodiment of the present invention.

As shown in FIG. 10, a magnetic sheet 50a for use in a radio frequency identification (RFID) antenna according to the sixth embodiment of the present invention is made of five layered structure in which two amorphous alloy ribbons 46a and 46b are inserted and laminated between three primarily compressed magnetic sheet layers 45a, 45b, and 45c. If the number of the laminated amorphous alloy ribbons 46a and 46b increases according to the above-described sixth embodiment, the thickness of the magnetic sheet slightly increases. Accordingly, the inductance of the magnetic sheet further increases and thus the magnetic permeability becomes very high. In the present invention, even in the case of being made of the multi-layered magnetic sheet in this way, for example, the magnetic sheet can be manufactured into the thickness of 3 mm or less by increasing the compression-molding pressure.

In the multilayer magnetic sheets according to the fifth and sixth preferred embodiments of the above-described present invention, since the amorphous alloy ribbons 46, 46a, and 46b laminated between the magnetic sheet layers 45a, 45b, and 45c generate microcracks 52 through a rolling or pressing process as described above, the loss gets to occur. Consequently, in the present invention, the frequency characteristic of being the disadvantage of the general amorphous alloy ribbons is improved, and simultaneously the complicated manufacturing process of slitting and bonding the amorphous alloy ribbons in order to use the conventional amorphous alloy ribbons can be improved to a simple process which enables automation.

In this case, since the necessary inductance from the RFID communications can be effectively obtained, the capacity of a battery can be extended in a battery pack of the same thickness, or the thickness of the battery pack can be made of the ultra thin pattern.

The RFID magnetic sheet according to the present invention can be mounted in a RFID apparatus using a radio frequency identification (RFID) system, and it can be applied to both a reader/writer and a transponder. However, it is not limited specially to the kind of the apparatus Particularly, since the RFID antenna according to the present invention includes the absorber of the thin thickness made of the magnetic sheet, it is very useful in the case that the RFID antenna is mounted in a portable apparatus having a radio frequency identification (RFID) function.

For example, the RFID magnetic sheet according to the present invention can be used in the RFID apparatus mounted in a battery unit of a mobile phone. This kind of the embodiment is exemplified in FIG. 11.

Figure 11:
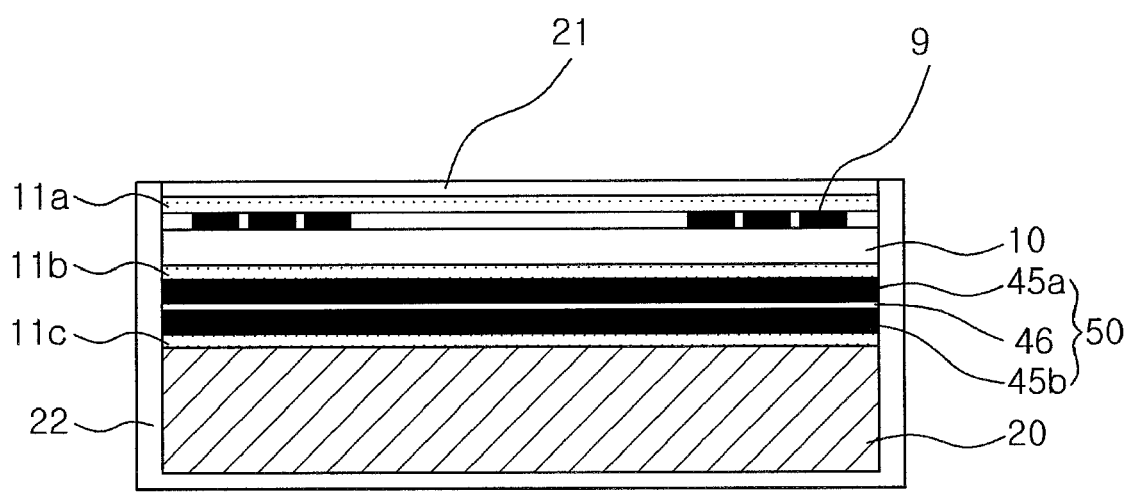
FIG. 11 is a cross-sectional view showing an example where a radio frequency identification (RFID) antenna which is manufactured using a magnetic sheet for use in a radio frequency identification (RFID) antenna according to the fifth embodiment according to the present invention is applied to a battery unit of a mobile phone.

FIG. 11 is a cross-sectional view showing an example where a radio frequency identification (RFID) antenna which is manufactured using a magnetic sheet for use in a radio frequency identification (RFID) antenna according to the fifth embodiment according to the present invention is applied to a battery unit of a mobile phone.

In FIG. 11, a reference numeral 9 denotes an antenna coil made of a conductive material, 10 does an insulating layer, 11a-11c do bonding layers, 20 does a battery cell, and 21 and 22 do a battery case. In FIG. 11, the multi-layered magnetic sheet 50 of the present invention made of the tripple structure including magnetic sheet layers 45a and 45b and an amorphous alloy ribbon 46 is inserted between the insulating layer 10 in which the antenna coil 9 is formed and the battery cell 20 through bonding layers 11b and 11c, respectively.

As described above, the RFID magnetic sheet according to the present invention can be manufactured in the form of a thin film and can be applied to various kinds of apparatuses such as PDAs, notebook computers, traffic cards, credit cards, and entrance cards in a manner that is similar to that applied to the mobile phone.

Hereinafter, the present invention will be described in more detail through various embodiments. But, the present invention is not limited to the following embodiments.

<Embodiment>

First and Second Embodiments

In order to have the same structure as that of the first embodiment shown in FIG. 2A, a copper antenna coil has been formed on an insulation layer of polyimide of 0.20 mm thick by etching the copper antenna coil to one Oz standard (that is, the coil thickness is 0.04 mm).

In the meantime, an amorphous alloy Fe—Si—B has been manufactured in order to manufacture a magnetic sheet for an absorber. Fe—B as a starting material has been a mother alloy. Electrolytic iron Fe and Si were mixed with the Fe—B starting material in order to fit for a composition ratio, and then melted together in a melting furnace, to thereby manufacture an ingot formed of a composition of $Fe_{79}(Si, B)_{21}$. Subsequently, after having charged the ingot in a high-frequency induction furnace, the high-frequency induction furnace has been turned on to receive an electric power, to thereby apply high-frequency energy to the ingot and melt the ingot completely. Then, metal of the fused composition of a high temperature was sprayed on a cooling roll rotating at high speed through a nozzle and an amorphous alloy ribbon having an average thickness of 0.02 mm was made. The manufactured amorphous alloy ribbon was manufactured with the powder with a ball mill. The manufactured powder was heat-treated at 320° C. for seven hours.

As described above, the manufactured alloy powder was mixed with urethane resin at a mixture ratio of 7:1. Then, the mixture of the alloy powder and urethane resin was coated on a base such as a substrate and then dried. Then, the base was separated therefrom and thus a magnetic sheet of 0.18 mm thick (first embodiment) or 0.25 mm thick (second embodiment) was manufactured.

The magnetic sheet was attached to the reverse surface to the surface where the antenna coil was formed in the insulating layer provided with the antenna coil using a double-sided tape of 0.025 mm thick (9461P, 3M, USA). A RFID antenna of the structure of FIG. 2B was made.

Third and Fourth Embodiments

As an alloy for a magnetic sheet according to third and fourth embodiments, an amorphous alloy of a composition of $Fe_{73.5}Cu_1Nb_3Si_{13.5}B_9$ being FINEMET (registered trademark) of the Japanese Hitach corporation or Vitroperm (registered trademark) of the German Vacuumschmelze corporation was used. Except that the magnetic sheet was made of 0.20 mm thick (third embodiment) or 0.25 mm thick (fourth embodiment), the RFID antenna was manufactured in the same method as that of the first embodiment.

Fifth Embodiment

Fe—B was used as a starting material in manufacturing an alloy for a magnetic sheet. In order to fit for a composition ratio, electrolytic iron (Fe) and Zr were added to manufacture an amorphous alloy of a composition of $Fe_{90}Zr_7B_3$. Except that the magnetic sheet was made of 0.25 mm thick, the RFID antenna was manufactured in the same method as that of the first embodiment.

Sixth Embodiment

Co—B was used as a starting material in manufacturing an alloy for a magnetic sheet. In order to fit for a composition ratio, elements of Co, Si, Fe, Ni and Cr were added to manufacture an amorphous alloy of a composition of $Co_{76}(Si, B)_{15}Fe_4(Cr, Ni)_5$. Except that the magnetic sheet was made of 0.40 mm thick, the RFID antenna was manufactured in the same method as that of the first embodiment.

FIRST COMPARATIVE EXAMPLE

Except that a magnetic sheet of 0.40 mm thick which was manufactured using finite ferrite powder whose diameter is 5 μm in which a composition ratio of Mn and Zn was 2:1 in a Mn—Zn group ferrite magnetic sheet was attached to a RFID antenna, the RFID antenna was manufactured in the same method as that of the first embodiment.

SECOND COMPARATIVE EXAMPLE

Except that a magnetic sheet of 0.25 mm thick which was manufactured using powder of a composition of $Fe_{75}Si_{25}$ which was made by having mixed Fe and Si at an atomic % ratio of 3:1, and making the mixture alloyed in a vacuum heat treatment furnace of a high temperature to then be pulverized, the RFID antenna was manufactured in the same method as that of the first embodiment.

EXPERIMENTAL RESULT

Inductance Performance Measurement

In the RFID antenna manufactured according to the first through fourth embodiments, the inductance performance was measured in the frequency region of 13.56 MHz, and the results were shown in the following Table 1.

TABLE 1

|  | Composition of Magnetic Sheet | Thickness of Magnetic Sheet (mm) | Inductance (µH) |
|---|---|---|---|
| 1st Embodiment | $Fe_{79}(Si,B)_{21}$ | 0.18 | 6.84 |
| 2nd Embodiment | $Fe_{79}(Si,B)_{21}$ | 0.25 | 7.45 |
| 3rd Embodiment | $Fe_{73.5}Cu_1Nb_3Si_{13.5}B_9$ | 0.20 | 6.92 |
| 4th Embodiment | $Fe_{73.5}Cu_1Nb_3Si_{13.5}B_9$ | 0.25 | 7.11 |
| 5th Embodiment | $Fe_{90}Zr_7B_3$ | 0.25 | 7.45 |
| 6th Embodiment | $Co_{76}(Si,B)_{15}Fe_4(Cr,Ni)_5$ | 0.40 | 8.71 |
| 1st Comparative Example | Mn—Zn group ferrite | 0.40 | 6.35 |
| 2nd Comparative Example | $Fe_{75}Si_{25}$ | 0.25 | 6.96 |

When the results of the first comparative example and the sixth embodiment are compared, it can be seen that the inductance performance was enhanced by 37% at the same thickness in the sixth embodiment. In the result of the third embodiment, the inductance performance was improved by approximately 8% in comparison with the first comparative example in spite of reducing the thickness of the magnetic sheet in the third embodiment than that of the first comparative example to the half. Moreover, if the experimental result of the second comparative example is compared with those of second, fourth and fifth embodiments, respectively, it can be seen that performance of the antennas of the embodiments was enhanced by 2~7% in comparison with that of the second comparative example.

[RFID Operation Distance Measurement]

The RFID operating distance was measured for the first and second comparative examples and the second embodiment. As a measuring method, a RFID reader is set up like a reader portion of FIG. 1, in which Moneta of the SK TELECOM corporation in the Republic of Korea was used as the RFID reader. Antennas manufactured in the first and second comparative examples and the second embodiment are installed in the battery pack of FIG. 6 and then an operating distance was measured using a cellular phone in which a RFID chip was included, respectively. The measurement results were shown in the following Table 2.

TABLE 2

|  | Thickness of Magnetic Sheet (mm) | Inductance (µH) | RFID Operating Distance (mm) |
|---|---|---|---|
| 2nd Embodiment | 0.25 | 7.45 | 35 |
| 1st Comparative Example | 0.40 | 6.35 | 24 |
| 2nd Comparative Example | 0.25 | 6.96 | 27 |

As illustrated in Table 2, it can be seen the RFID operating distance of the second embodiment was further secured by about 30~45% in comparison with the first and second comparative examples. In the RFID communications using the cellular phone to which the present invention has been applied, this means that user's inconveniences due to the conventional short operating distance can be solved to some degrees.

Seventh Embodiment

Except that the magnetic sheet was made of 0.23 mm thick, the RFID antenna was manufactured in the same method as that of the first embodiment. The inductance performance of the antenna was measured in the frequency region of 13.56 MHz and the result was shown in the following Table 3.

Eighth through Tenth Embodiments

In the eighth through tenth embodiments, the amorphous alloy of the first embodiment was used. Except that the magnetic sheet and the alloy ribbons using alloy powder were laminated as shown in FIGS. 3B, 3C and 3E, the RFID antennas of the eighth embodiment (FIG. 3B), the ninth embodiment (FIG. 3C) and the tenth embodiment (FIG. 3E) were manufactured in the same method as that of the first embodiment. The inductance performance of these antennas was measured in the frequency region of 13.56 MHz and the results were shown in the following Table 3.

TABLE 3

|  | Composition of Magnetic Sheet | Direction of arrangement of alloy ribbons | Width of alloy ribbon (mm) | Thickness of ribbon (mm) | Thickness of powder sheet (mm) | Inductance (µH) |
|---|---|---|---|---|---|---|
| 1st Comparative Example | Mn—Zn group Ferrite | — | — | — | 0.40 | 6.35 |
| 2nd Comparative Example | $Fe_{75}Si_{25}$ | — | — | — | 0.25 | 6.96 |
| 7th Embodiment | $Fe_{79}(Si,B)_{21}$ | — | — | — | 0.23 | 7.18 |

TABLE 3-continued

| | Composition of Magnetic Sheet | Direction of arrangement of alloy ribbons | Width of alloy ribbon (mm) | Thickness of ribbon (mm) | Thickness of powder sheet (mm) | Inductance (μH) |
|---|---|---|---|---|---|---|
| 8th Embodiment | $Fe_{79}(Si,B)_{21}$ | Lengthy direction of antenna | 1.5 | 0.02 | 0.23 | 8.03 |
| 9th Embodiment | $Fe_{79}(Si,B)_{21}$ | width direction of antenna | 1.5 | 0.02 | 0.23 | 8.47 |
| 10th Embodiment | $Fe_{79}(Si,B)_{21}$ | Crosslink arrangement | 1.5 | 0.04 | 0.23 | 7.67 |

Referring to Table 3, when the alloy ribbon of 0.02 mm or 0.04 mm thick was attached to the alloy powder magnetic sheet of 0.23 mm thick (eight through tenth embodiments), it can be seen the inductance performance improvement of about 7~18% was accomplished in comparison with the case of using only alloy powder magnetic sheet (seventh embodiment). It can be also seen that the inductance performance improvement of about 21-33% was accomplished in comparison with the Mn—Zn ferrite of 0.4 mm thick. It can be also seen that the inductance performance improvement of about 10-22% could be obtained in comparison with the $Fe_{75}Si_{25}$ magnetic sheet of 0.25 mm thick.

Eleventh through Fourteenth Embodiments

In the eleventh through fourteenth embodiments, a substrate on which partially hardened prepreg resin was coated as an insulating layer forming an antenna coil and made of phenol/polyimide was used. Except that the thickness of the insulating layer was formed of 0.080 mm (eleventh embodiment), 0.050 mm (twelfth embodiment), 0.025 mm (thirteenth embodiment), and 0.013 mm (fourteenth embodiment), respectively, the RFID antenna was manufactured in the same manner as that of the first embodiment. With respect to the antennas of the eleventh through fourteenth embodiments, the air-core inductance and the direct current (DC) resistance were measured in the frequency region of 13.56 MHz and the results were shown in the following Table 4.

THIRD AND FOURTH COMPARATIVE EXAMPLES

Except that the thickness of the insulating layer forming the antenna coil was formed of 0.17 mm thick and 0.20 mm thick, respectively, the RFID antenna was manufactured in the same manner as that of the first embodiment. With respect to the antennas of the third and fourth comparative examples, the air-core inductance and the direct current (DC) resistance were measured in the frequency region of 13.56 MHz and the results were shown in the following Table 4.

TABLE 4

| | Thickness of coil and insulating layer (mm) | Thickness of insulating layer (mm) | Thickness of copper plate forming coil (mm) | DC Current (Ω) | Air-core inductance (μH) |
|---|---|---|---|---|---|
| 3rd Comparative Example | 0.210 | 0.170 | 0.04 | 0.728 | 4.93 |
| 4th Comparative Example | 0.240 | 0.200 | 0.04 | 0.732 | 4.92 |
| 11th Embodiment | 0.120 | 0.080 | 0.04 | 0.731 | 4.94 |
| 12th Embodiment | 0.090 | 0.050 | 0.04 | 0.730 | 4.93 |
| 13th Embodiment | 0.065 | 0.025 | 0.04 | 0.727 | 4.91 |
| 14th Embodiment | 0.053 | 0.013 | 0.04 | 0.732 | 4.92 |

The above-described comparative examples and embodiments were performed as methods capable of increasing the performance of a battery by 20% or greater at minimum in a battery pack whose thickness was made thinner than or in the same thickness as an available battery pack. By making the thickness of the insulating layer of the RFID antenna itself thin while maintaining the air-core inductance of the antenna used for RFID to be the same level, the thickness of the RFID antenna was made thinner by 22-57% in comparison with the thickness of the existing antenna. The antennas of the eleventh through fourteenth embodiments were more effective than the antenna of the first through tenth embodiments.

FIFTEENTH EMBODIMENT AND FIFTH COMPARATIVE EXAMPLE

Except that the thickness of the magnetic sheet was made 0.35 mm, the ferrite sheet (fifth comparative example) and the magnetic sheet were manufactured with the same method as the first comparative example. Except that the ferrite sheet (fifth comparative example) and the magnetic sheet were made 0.35 mm thick, the amorphous alloy powder sheet (fifteenth embodiment) was manufactured in the same method as the first embodiment. Then, the high-frequency absorption rate of the amorphous alloy powder sheet was measured. To measure the high-frequency absorption rate, the energy of the electromagnetic wave was supplied to the magnetic sheet based on the corresponding frequency, and then the energy of the electromagnetic wave which was transmitted to the opposite side to the magnetic sheet was compared to the energy of the electromagnetic wave supplied to the magnetic sheet. The measurement results were shown in the following Table 5.

TABLE 5

|  |  | High-frequency (GHz) | | | |
|---|---|---|---|---|---|
|  |  | 2 | 3 | 5 | 6 |
| High-frequency absorption rate (dB) | 15th Embodiment | −0.9484 | −1.2445 | −1.6892 | −1.9617 |
|  | 5th Comparative Example | −0.7756 | −0.9045 | −1.0008 | −1.1084 |
| Ratio of enhancement of high-frequency absorption rate of fifteenth embodiment for fifth comparative example (%) | | 22.2 | 37.5 | 68.7 | 76.9 |

As shown in Table 5, it can be seen the magnetic sheet of the fifteenth embodiment is superior to that of the fifth comparative example in view of a shield effect for electromagnetic waves of several gigahertz (GHz) band.

Sixteenth and Seventh Embodiment

The amorphous alloy ribbon of a composition of $Fe_{79}(Si, B)_{21}$ was made of 0.02 mm thick in the same manner as that of the first embodiment, and the manufactured amorphous alloy ribbon was manufactured into powder through a hammer mill. At 320° C., the manufactured powder was heat-treated for seven hours. As described above, the manufactured alloy powder was mixed with urethane resin at a mixture ratio of 7:1. Then, the mixture of the alloy powder and urethane resin was coated on a base such a substrate and then dried. Then, the base was separated therefrom to manufacture a mixture sheet. Then, a hot rolling process was performed at 70° C. in the mixture sheet to thus manufacture a primarily compression-mold ed magnetic sheet of 0.2 mm thick (sixteenth embodiment) or 0.1 mm thick (seventeenth embodiment).

Eighteenth and Nineteenth Embodiment

As an alloy for a magnetic sheet according to eighteenth and nineteenth embodiments, an amorphous alloy of a composition of $Fe_{73.5}Cu_1Nb_3Si_{13.5}B_9$ being FINEMET (registered trademark) of the Japanese Hitach corporation or Vitroperm (registered trademark) of the German Vacuumschmelze corporation was used in the same manner as that of the third embodiment. The mixture powder was manufacture in the same manner as that of the sixteenth embodiment, and the manufactured powder was heat-treated at 540° C. for three hours. The primarily compression-mold ed magnetic sheet was manufactured in the same manner as that of the sixteenth embodiment, and the magnetic sheet was made of 0.20 mm thick (eighteenth embodiment) or 0.1 mm thick (nineteenth embodiment).

Twentieth Embodiment

After the primarily compression-mold ed magnetic sheet had been manufactured in the same method as that of the sixteenth embodiment, the amorphous alloy ribbon of a composition of $Fe_{73.5}Cu_1Nb_3Si_{13.5}B_9$ was cut in the same size as that of the mixture sheet and then was coupled between the two primarily compression-mold ed magnetic sheets, using an adhesive having the same component as that of a resin for a binder or without using any adhesive, as shown in FIG. 9. The multilayer sheet which had been obtained by binding the primarily compression-mold ed magnetic sheets and the amorphous alloy ribbon was hot rolled at 70° C. to thereby manufacture a secondarily compression-mold ed single-body magnetic sheet (twentieth embodiment) of 0.2 mm thick.

Twenty-First Embodiment

Co—B was used as a starting material in manufacturing an amorphous alloy ribbon which was inserted between the primarily compression-mold ed magnetic sheets, in the same manner as that of the sixth embodiment. Except that in order to fit for a composition ratio, elements of Co, Si, Fe, Ni and Cr were added to manufacture an amorphous alloy of a composition of $Co_{76}(Si, B)_{15}Fe_4(Cr, Ni)_5$, the magnetic sheet was made of 0.2 mm thick, in the same method and structure as those of the twentieth embodiment.

Twenty-Second Embodiment

The primarily compression-mold ed magnetic sheet was manufactured in the same method as that of the seventeenth embodiment, and the secondarily compression-mold ed multilayer magnetic sheet was manufactured of 0.2 mm thick, in the same method and structure as those of the twenty-first embodiment.

Twenty-Third Embodiment

The amorphous alloy of a composition of $Fe_{90}Zr_7B_3$ was manufactured in the same manner as that of the fifth embodiment. The primarily compression-mold ed magnetic sheet was manufactured in the same method as that of the sixteenth embodiment, and the structure and method of manufacturing the amorphous alloy ribbon which was inserted between the multilayer sheets was manufactured in the same manner as that of the twenty-first embodiment. Accordingly, the secondarily compression-mold ed magnetic sheet was manufactured of 0.2 mm thick.

Twenty-Fourth Embodiment

The primarily compression-molded magnetic sheet was manufactured in the same method as that of the sixteenth embodiment, and the amorphous alloy ribbon which was inserted between the multilayer sheets was manufactured in the same manner as that of the eighteenth embodiment. The obtained two amorphous alloy ribbons were inserted between the magnetic sheets so that the amorphous alloy ribbons existed between the magnetic sheets. A multi-layering method was performed in the same manner as that of the twentieth embodiment and the multilayer magnetic sheet was manufactured of 0.3 mm thick, as shown in FIG. 10.

SIXTH COMPARATIVE EXAMPLE

The MPP powder was used as the original material of the magnetic sheet and the MPP powder was manufactured by mixing and melting elements in order to fit for a composition of $Ni_{81}Fe_{17}Mo_2$, and then atomizing the melted result. The MPP powder manufactured in the form of a spherical shape was flattened using a ball mill, and then the powder of 5 μm or less in diameter was distributed and used. The magnetic sheet of 0.4 mm thick was manufactured.

[Inductance Performance Measurement]

The RFID antenna of the same structure as that of FIG. 11 was manufactured using the magnetic sheets which were manufactured according to the sixteenth through twenty-fourth embodiments, the third embodiment, and the sixth comparative example. The inductance performance was measured in the frequency region of 13.56 MHz and the results were shown in the following Table 6.

TABLE 6

| | Components of multilayer sheet | | Thickness of magnetic sheet (mm) | Inductance (μH) |
|---|---|---|---|---|
| | Magnetic Sheet | Amorphous alloy ribbon | | |
| 16th Embodiment | $Fe_{79}(Si,B)_{21}$ | None | 0.2 | 7.93 |
| 17th Embodiment | $Fe_{79}(Si,B)_{21}$ | None | 0.1 | 7.22 |
| 18th Embodiment | $Fe_{73.5}Si_{13.5}B_9Cu_1Nb_3$ | None | 0.2 | 8.16 |
| 19th Embodiment | $Fe_{73.5}Si_{13.5}B_9Cu_1Nb_3$ | None | 0.1 | 7.92 |
| 20th Embodiment | $Fe_{79}(Si,B)_{21}$ | $Fe_{73.5}Si_{13.5}B_9Cu_1Nb_3$ | 0.2 | 15.16 |
| 21st Embodiment | $Fe_{79}(Si,B)_{21}$ | $Co_{76}(Si,B)_{15}Fe_4(Ni,Cr)_5$ | 0.2 | 15.24 |
| 22nd Embodiment | $Fe_{73.5}Si_{13.5}B_9Cu_1Nb_3$ | $Co_{76}(Si,B)_{15}Fe_4(Ni,Cr)_5$ | 0.2 | 17.32 |
| 23rd Embodiment | $Fe_{90}Zr_7B_3$ | $Co_{76}(Si,B)_{15}Fe_4(Ni,Cr)_5$ | 0.2 | 16.11 |
| 24th Embodiment | $Fe_{79}(Si,B)_{21}$ | $Fe_{73.5}Si_{13.5}B_9Cu_1Nb_3$ | 0.3 | 21.33 |
| 6th Comparative Example | MPP powder | None | 0.4 | 13.62 |
| 3rd Embodiment | $Fe_{73.5}Si_{13.5}B_9Cu_1Nb_3$ | None | 0.2 | 6.92 |
| 9th Embodiment | $Fe_{79}(Si,B)_{21}$ | $Fe_{73.5}Si_{13.5}B_9Cu_1Nb_3$ | 0.23 | 8.47 |

When the results of the third embodiment and the eighteenth embodiment are compared, it can be seen that the inductance performance of the compression-mold ed magnetic sheet according to the eighteenth embodiment was enhanced by 18% than that of the third embodiment although the magnetic sheet was manufactured at the same thickness using the amorphous alloy powder of the same composition in the case of the third and eighteenth embodiments. In the result of the nineteenth embodiment, the inductance performance was improved by approximately 14% in comparison with the third embodiment in spite of reducing the thickness of the magnetic sheet than that of the third embodiment to the half. The difference in the inductance is due to the difference in the density among the third embodiment and the sixteenth through nineteenth embodiments.

Figure 12A:
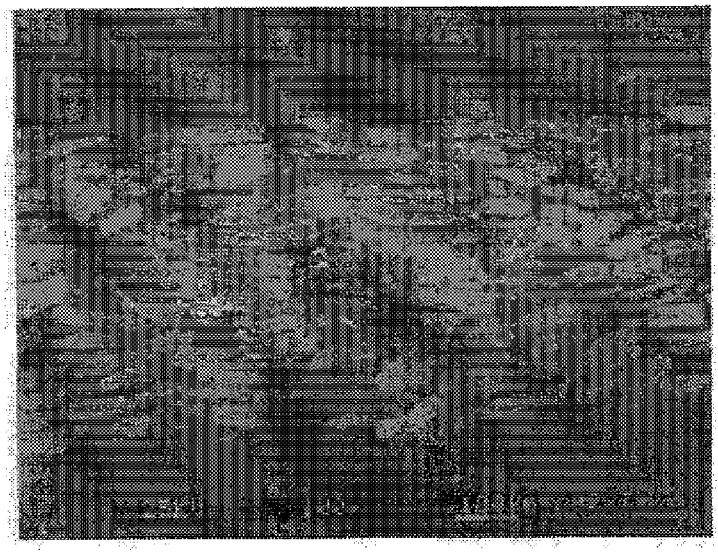
FIGS. 12A and 12B are a sectional picture of a magnetic sheet which has not been compressed and molded and that of the magnetic sheet which has been compressed and molded, respectively.
Figure 12B:
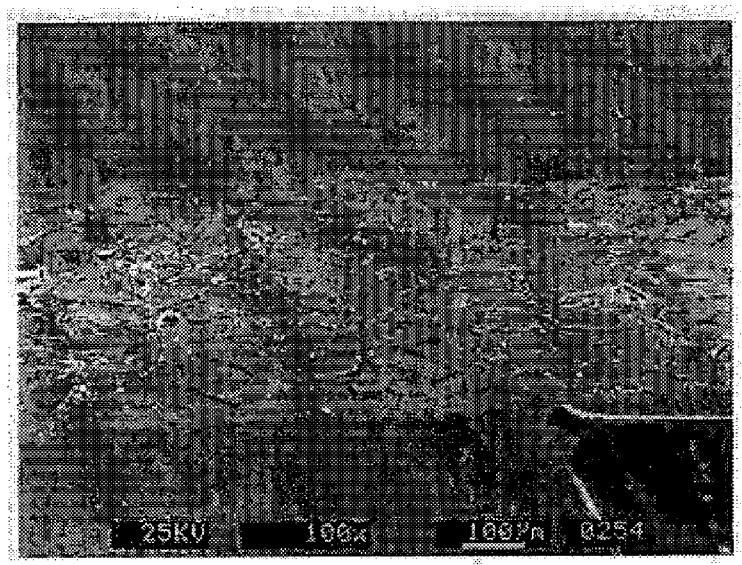

FIG. 12A shows a magnetic sheet of the third embodiment, that is, a sectional picture of the magnetic sheet before being compressed and molded, and FIG. 12B shows a magnetic sheet of the sixteenth embodiment, that is, a sectional picture of the magnetic sheet which has been compressed and molded. The relative density of the magnetic sheet versus the amorphous alloy powder of the third embodiment is 52% T.D. (Theoretical Density), and the relative density of the seventeenth embodiment is 68% T.D. or greater.

The twentieth through twenty-third embodiments in which the amorphous alloy ribbon has been added between the magnetic sheets, have improved the inductance of 79%~100% compared to the ninth embodiment. This result was due to the fact that the twentieth through twenty-third embodiments generated a smaller eddy current loss than that of the ninth embodiment in view of the area of the amorphous alloy ribbon, and thus the soft magnetic property was not lost even in the frequency region of 13.56 MHz.

The twenty-fourth embodiment employing the double-layered amorphous alloy ribbon (0.3 mm thick) showed the inductance of 21.33 μH. Although the thickness of the twenty-fourth embodiment 24 was reduced by 33% in comparison with the inductance 8.71 μH of the sixth embodiment (0.4 mm thick), the inductance value became higher by 145%.

The magnetic sheet for the RFID antenna according to the present invention can be manufactured with a thin and uniform thickness of 0.35 mm or less. Accordingly, the inductance deviation is not big. Also, the magnetic permeability is excellent even with the thin magnetic sheet. As a result, in the case that the magnetic sheet for the RFID antenna is applied to the antenna absorber for the RFID transponder, the function of the high inductance performance appears at the operating frequency of the frequency region of 135 kHz or less and the frequency region of 13.56 MHz frequency which is the electromagnetic wave necessary for the RFID communications.

Therefore, in the case that the magnetic sheet for the RFID antenna according to the present invention is mounted to the apparatus having the radio frequency identification (RFID) function, the error of formation and transmission of data can be minimized. In addition, the apparatus employing the magnetic sheet according to the present invention can be implemented in the form of a thin film and with a light weight. Moreover, since the magnetic sheet for the RFID antenna according to the present invention absorbs the electromagnetic wave of several gigahertz (GHz) band generated in the electronic circuit mounted to the apparatus without a separate blocking layer, it is possible to obtain a noise attenuation effect to some degrees although a separate conductive sheet is not attached to the magnetic sheet. The magnetic sheet for the RFID antenna according to the present invention is useful especially for the portable apparatus like the mobile phone.

Furthermore, the magnetic sheet for the RFID antenna according to the present invention is formed of a multilayer structure but can be manufactured at the cheap cost while having the thin and uniform thickness of 0.2 mm or less through a compression-molding process with a superior productivity. Further, the magnetic sheet for the RFID antenna according to the present invention has the high inductance performance, the small inductance deviation, and the excellent magnetic permeability even with the thin magnetic sheet. Thus, in the case that the antenna magnetic sheet is applied to the RFID transponder antenna, the high inductance function is obtained at the operating frequency of the frequency region of 135 kHz or less, and the frequency region of 13.56 MHz which is the electromagnetic wave necessary for the RFID communications.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A method of manufacturing a multi-layered magnetic sheet for a radio frequency identification antenna, the method comprising the steps of:
preparing first and second magnetic sheet layers made of alloy powder including at least one kind of an amorphous alloy selected from the group consisting of Fe—Si—B, Fe—Si—B—Cu—Nb, Fe—Zr—B, and Co—Fe—Si—B, the first and second magnetic sheet layers are made by the steps of mixing amorphous alloy powder including at least one kind of an amorphous alloy selected from the group consisting of Fe—Si—B, Fe—Si—B—Cu—Nb, Fe—Zr—B, and Co—Fe—Si—B and a resin for a binder, and depositing the mixture on a base member in the form of a thin film and then drying the base member to form a dried magnetic sheet layer;
preparing a first amorphous alloy ribbon made of one kind of the amorphous alloys, the first amorphous alloy ribbon made by melt-spinning process; and
laminating the first amorphous alloy ribbon between the first and second magnetic sheet layers and then compression-molding the laminated multi-layered magnetic sheet to increase a relative density of the laminated magnetic sheet and simultaneously form microcracks on the first amorphous alloy ribbon.

2. The method of manufacturing a multi-layered magnetic sheet for a RFID antenna, according to claim 1, further comprising the steps of:
preparing a second amorphous alloy ribbon made of one kind of the amorphous alloys and a third magnetic sheet layer made of alloy powder including at least one kind of the amorphous alloys; and
before compression-molding the laminated multi-layered magnetic sheet, laminating the second amorphous alloy ribbon on the surface of any one of the first and second magnetic sheet layers and laminating the third magnetic sheet layer on the surface of the second amorphous alloy ribbon.

3. The method of manufacturing a multi-layered magnetic sheet for a RFID antenna, according to claim 1, wherein the step of compression-molding the laminated multi-layer magnetic sheet is executed by hot rolling, hot pressing, cold rolling, or cold pressing.

4. The method of manufacturing a multi-layered magnetic sheet for a RFID antenna, according to claim 1, wherein the thickness of the compression-molded multi-layered magnetic sheet is 0.2 mm or less.

5. The method of manufacturing a multi-layered magnetic sheet for a RFID antenna, according to claim 1, wherein the amorphous alloy selected from the group consisting of Fe—Si—B, Fe—Si—B—Cu—Nb, Fe—Zr—B, and Co—Fe—Si—B is heat-treated at the temperature of 300° C. to 600° C. for ten hours or less before the step of laminating the first amorphous alloy ribbon.

* * * * *